(12) United States Patent
Tanaka et al.

(10) Patent No.: US 8,427,291 B2
(45) Date of Patent: Apr. 23, 2013

(54) INFORMATION RECORDING APPARATUS

(75) Inventors: Shinichi Tanaka, Kobe (JP); Minoru Yoshimura, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 466 days.

(21) Appl. No.: 12/314,415

(22) Filed: Dec. 10, 2008

(65) Prior Publication Data

US 2009/0153312 A1 Jun. 18, 2009

(30) Foreign Application Priority Data

Dec. 12, 2007 (JP) ................................. 2007-321249

(51) Int. Cl.
*B60Q 1/00* (2006.01)

(52) U.S. Cl.
USPC ......... 340/438; 340/463; 340/429; 340/425.5

(58) Field of Classification Search .................. 340/438, 340/425.5, 429, 463
See application file for complete search history.

(56) References Cited

U.S. PATENT DOCUMENTS

| | | | |
|---|---|---|---|
| 2,990,547 A | 6/1961 | McDougal | |
| 3,995,277 A | 11/1976 | Olyphant | |
| 4,038,662 A | 7/1977 | Turner | |
| 4,135,184 A | 1/1979 | Pruzick | |
| 4,860,019 A | 8/1989 | Jiang et al. | |
| 5,103,235 A | 4/1992 | Clemens | |
| 5,510,765 A * | 4/1996 | Madau | 340/541 |
| 5,796,336 A * | 8/1998 | Ishino et al. | 340/566 |
| 5,825,291 A | 10/1998 | Platt et al. | |
| 5,877,728 A | 3/1999 | Wu et al. | |
| 6,093,469 A | 7/2000 | Callas | |
| 6,100,804 A | 8/2000 | Brady et al. | |
| 6,392,599 B1 | 5/2002 | Ganeshmoorthy | |
| 6,400,273 B1 | 6/2002 | Bettine | |
| 6,737,962 B2 * | 5/2004 | Mayor | 340/431 |
| D492,670 S | 7/2004 | Hung et al. | |
| 7,123,151 B2 | 10/2006 | Garber et al. | |
| 7,123,207 B2 | 10/2006 | Yazdandoost | |

(Continued)

FOREIGN PATENT DOCUMENTS

| | | |
|---|---|---|
| JP | A-2006-168518 | 6/2006 |
| JP | A-2006-227173 | 8/2006 |

(Continued)

OTHER PUBLICATIONS

Notice of Rejection issued in Japanese Patent Application No. 2007-321249; mailed Apr. 3, 2012; with partial English-language translation.

*Primary Examiner* — George Bugg
*Assistant Examiner* — Naomi Small
(74) *Attorney, Agent, or Firm* — Oliff & Berridge, PLC

(57) ABSTRACT

Image and sound information are acquired from a camera and a microphone and the information is stored into a second RAM for a first time period from detection of occurrence of an abnormal condition of a vehicle by a sensor. When occurrence of an abnormal condition of the vehicle has been detected by the sensor during the first time period from the detection of occurrence of an abnormal condition of the vehicle, image and sound information is acquired from the camera and the microphone and the information is stored into the second RAM for a second time period from the previous detection of occurrence of an abnormal condition of the vehicle, and the image and sound information stored into the second RAM for the second time period Tb are stored into a nonvolatile ROM.

6 Claims, 27 Drawing Sheets

U.S. PATENT DOCUMENTS

| | | |
|---|---|---|
| 7,324,058 B2 | 1/2008 | Kai |
| 7,584,034 B2 * | 9/2009 | Kosugi .................... 701/32.4 |
| 2003/0006940 A1 | 1/2003 | Washiro et al. |
| 2003/0080919 A1 | 5/2003 | Forster et al. |
| 2003/0154009 A1 * | 8/2003 | Basir et al. ................ 701/35 |
| 2004/0217866 A1 | 11/2004 | Copeland et al. |
| 2005/0024287 A1 | 2/2005 | Jo et al. |
| 2006/0244577 A1 * | 11/2006 | Tanaka et al. ............ 340/429 |
| 2006/0244662 A1 | 11/2006 | Bauer et al. |
| 2007/0001925 A1 | 1/2007 | Bae et al. |
| 2007/0024443 A1 * | 2/2007 | Babich et al. ............ 340/545.2 |
| 2007/0050109 A1 * | 3/2007 | Ozawa ...................... 701/35 |
| 2007/0109106 A1 | 5/2007 | Maeda et al. |

FOREIGN PATENT DOCUMENTS

| | | |
|---|---|---|
| JP | A-2006-235732 | 9/2006 |
| JP | A-2006-302017 | 11/2006 |
| JP | A-2007-157113 | 6/2007 |
| JP | A-2007-238093 | 9/2007 |
| WO | WO 2007/066613 A1 | 6/2007 |

* cited by examiner

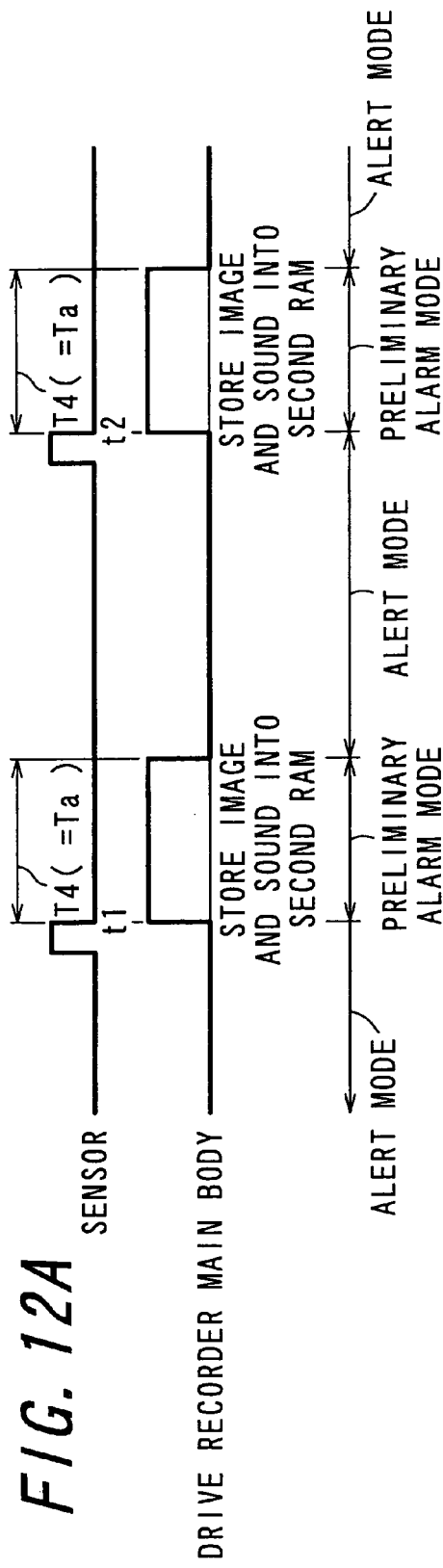
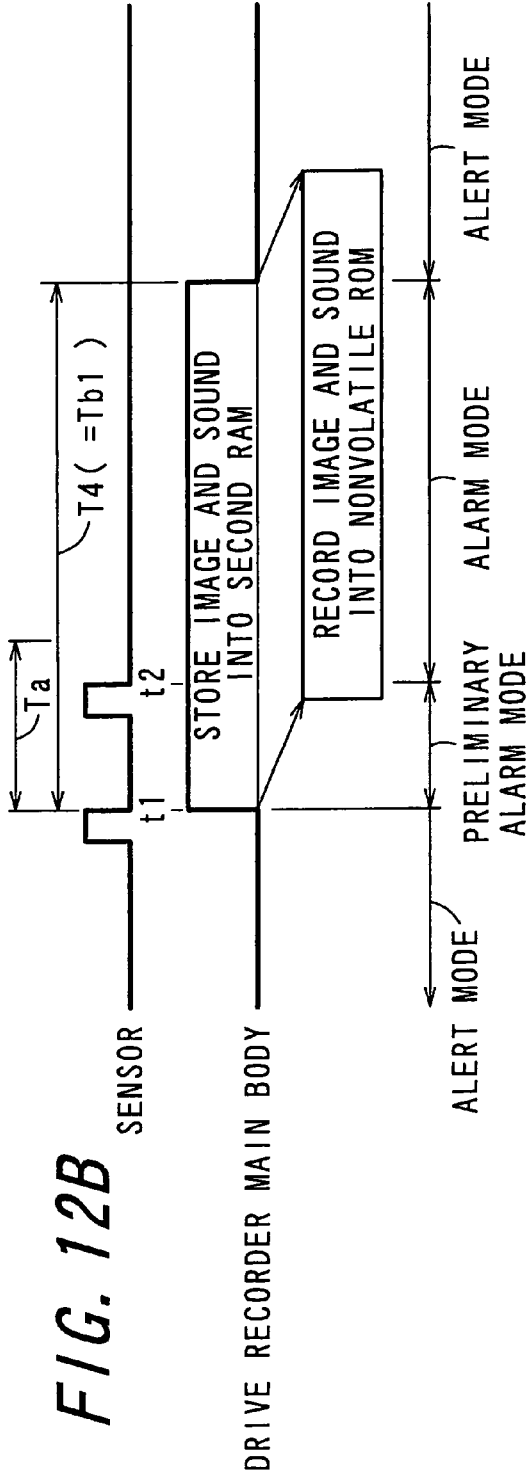
FIG. 12A
FIG. 12B

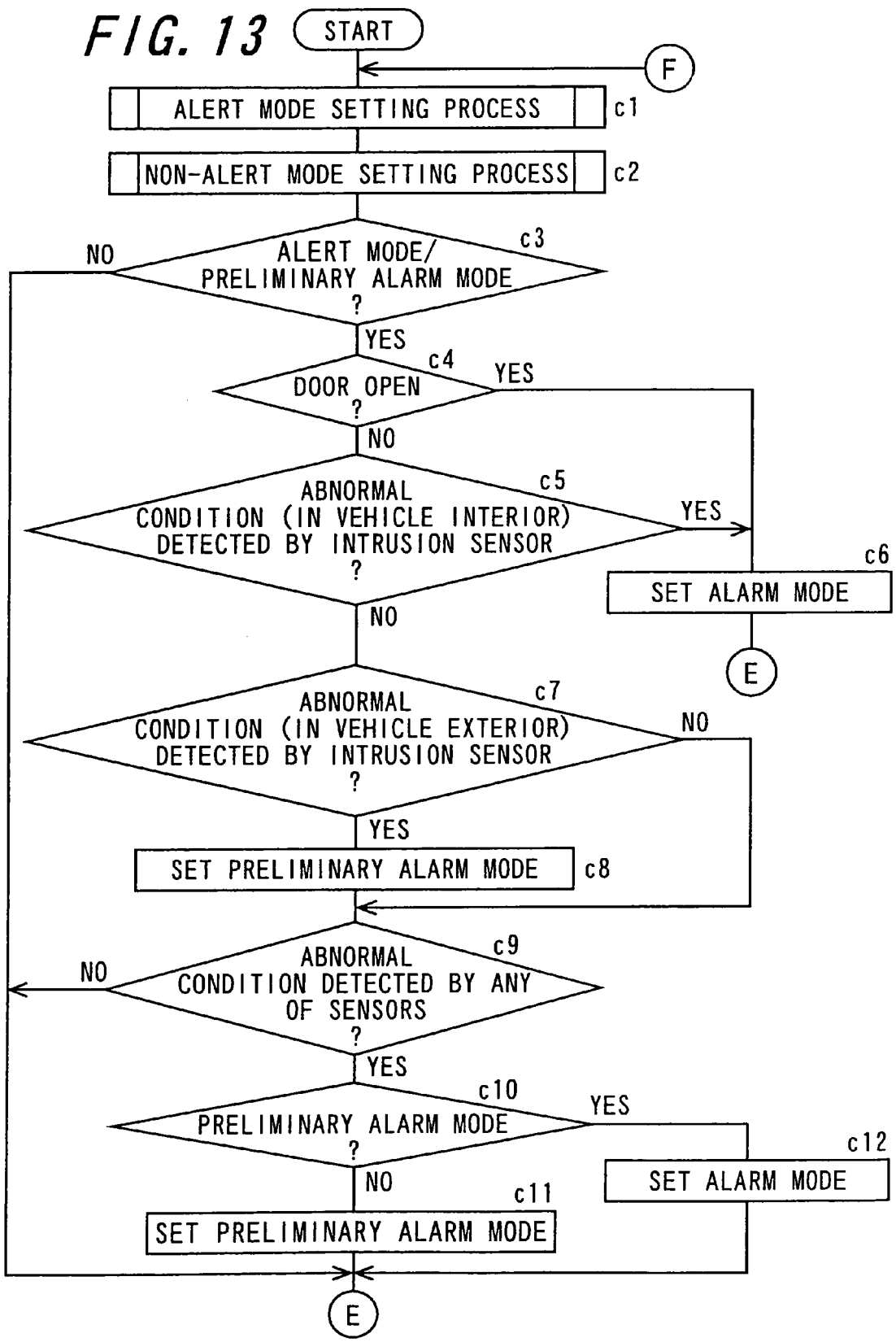

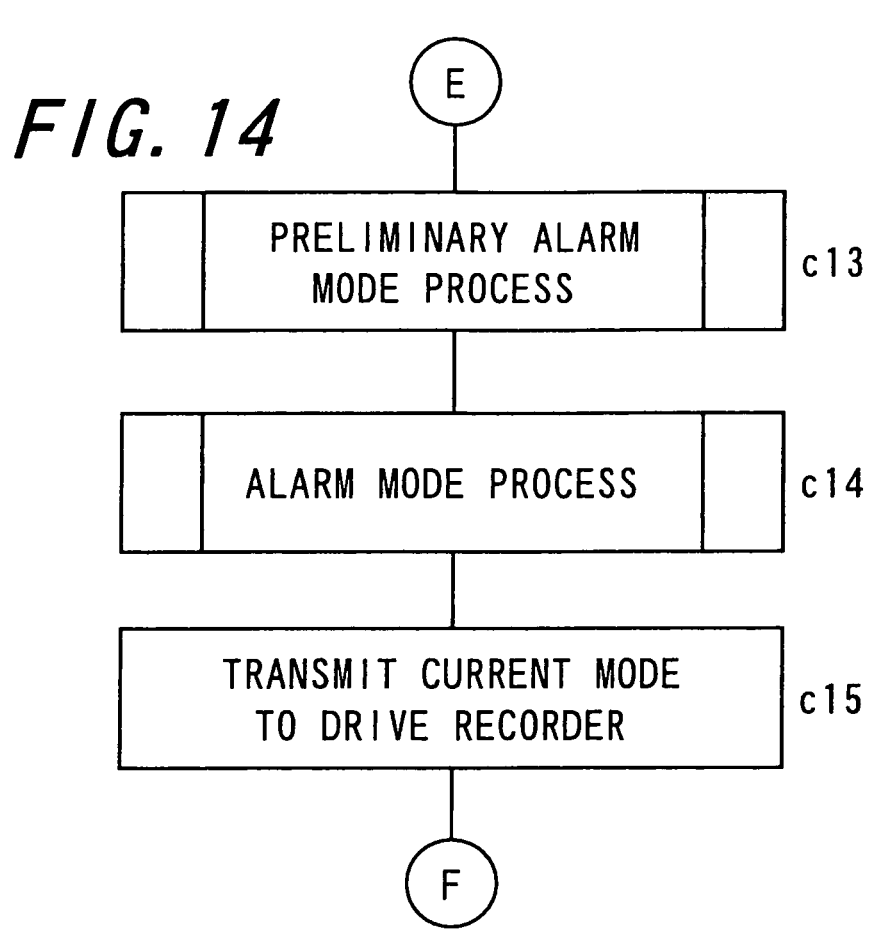

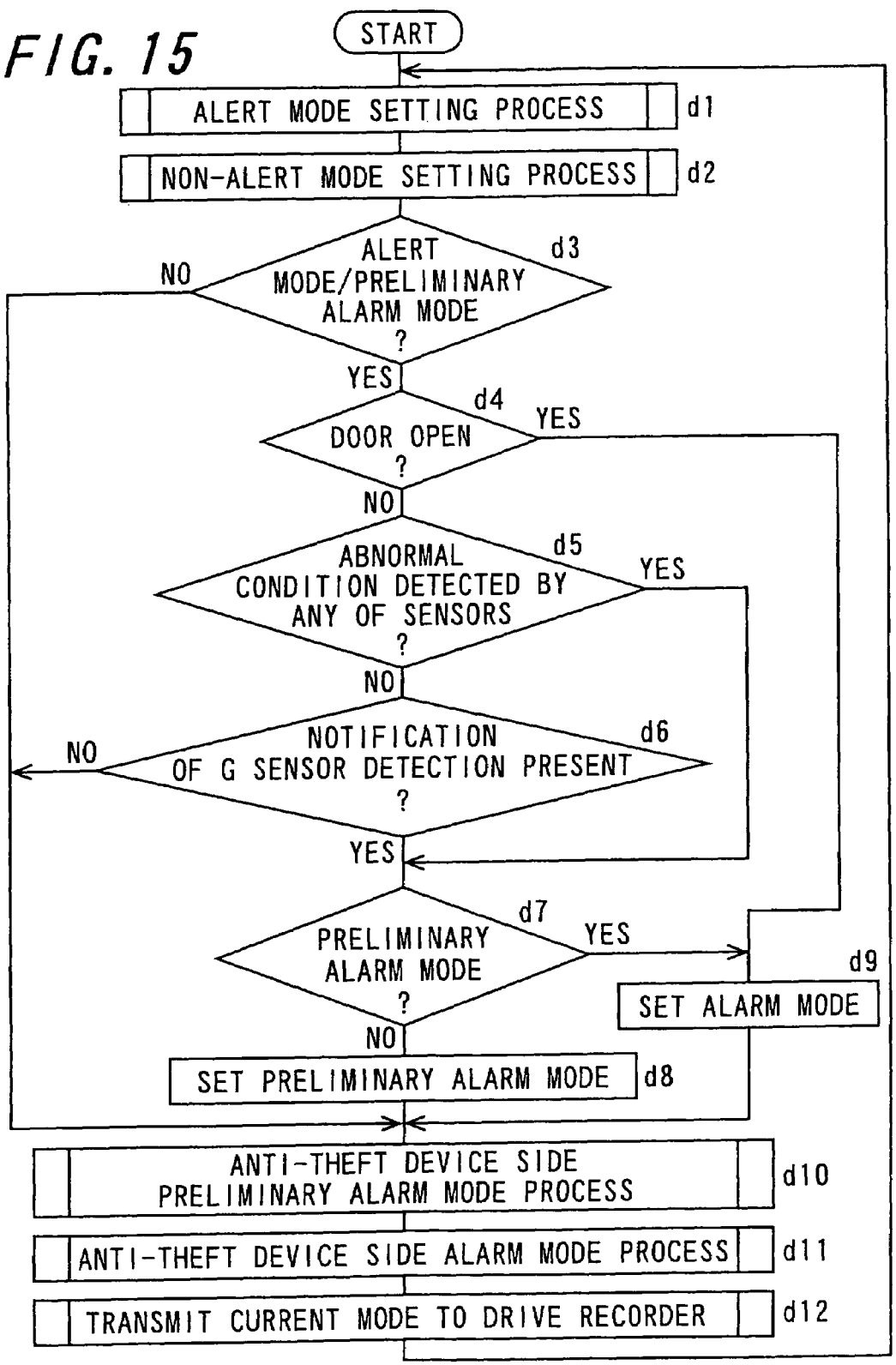

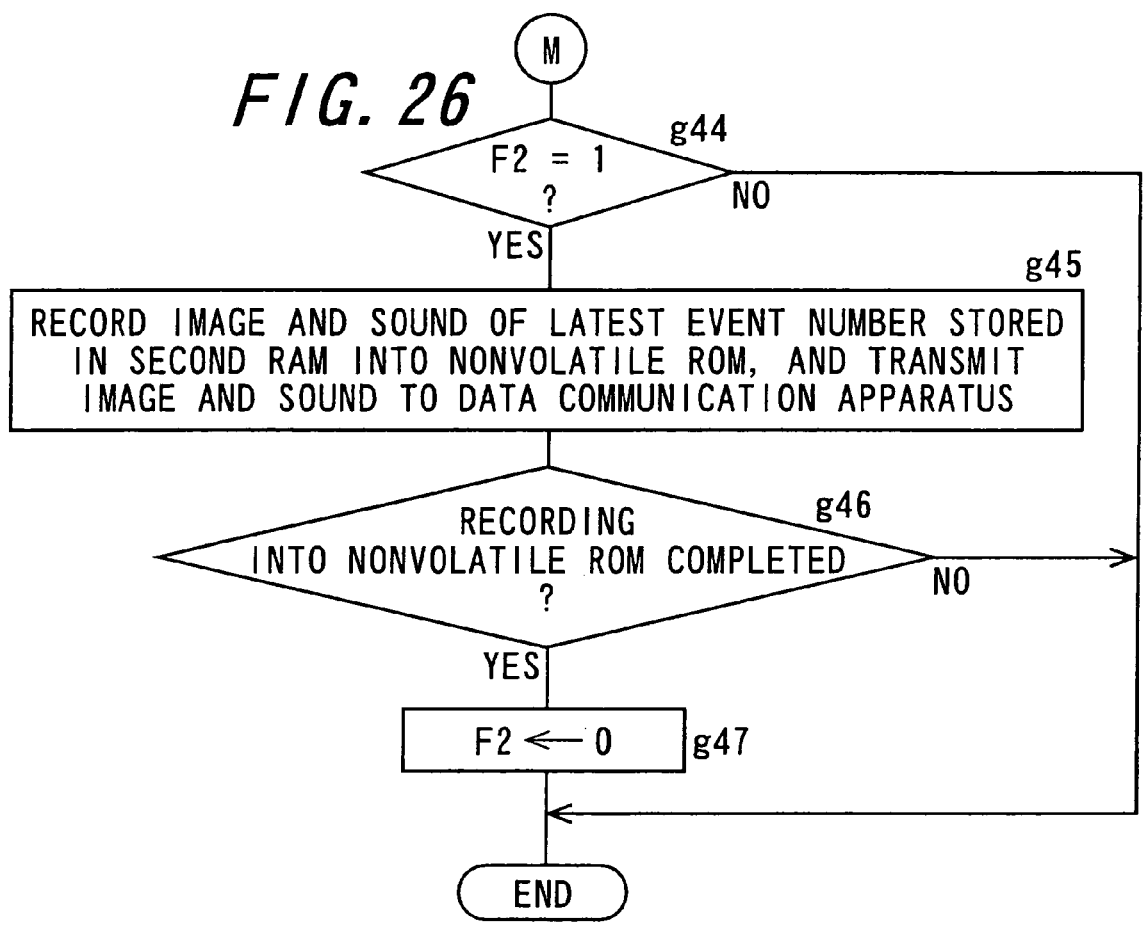

INFORMATION RECORDING APPARATUS

BACKGROUND OF THE INVENTION

1. Field of the Invention

The present invention relates to an information recording apparatus that records information acquired with a camera and/or a microphone provided in a vehicle into a recording medium.

2. Description of the Related Art

Drive recorders that are mounted in vehicles for recording images of an accident that occurs during driving have been put into practical use. Security devices including the so-called anti-theft function have also been put into practical use. Such devices capture images of the interior of a vehicle using a drive recorder as mentioned above upon detection of an abnormal condition such as a theft of a parked vehicle, including, for example, an impact applied to the vehicle and an illegal intrusion into the vehicle by a third party other the user of the vehicle, and records the captured images into a recording medium.

According to a first related art, the security device records images as an ordinary drive recorder when an ignition (IG) switch is on and the vehicle is in operation, i.e., during driving conditions. Even when the IG switch has been turned off, the drive recorder is operated to record images in order to prepare for an abnormal condition such as a theft (for example, see Japanese Unexamined Patent Publications JP-A 2006-227173 and JP-A 2006-302017). With the first related art, the drive recorder continues to capture images even in a case where the IG switch is off, i.e., the battery mounted in the vehicle is not being charged and no abnormal condition has occurred. The current consumption resulting, in particular, from operating a camera is very large, and therefore, the operation of the camera may cause exhaustion of the battery.

In view of such a problem, according to a second related art, images are captured for a predetermined time period and recorded into the recording medium, only when the IG switch is off and an abnormal condition has been detected by a G sensor, (for example, see Japanese Unexamined Patent Publication JP-A 2006-235732). Accordingly, it is possible to record images when an abnormal condition such as a theft occurs, while saving power consumption.

However, according to the second related art, images are recorded into the recording medium for a predetermined time period each time an abnormal condition is detected by the G sensor. Erroneous detections are inherent to a theft detection performed by sensors such as a G sensor. Large vibrations are generated, for example, in a case where a large vehicle such as a truck passes near a parked vehicle, a case where there is a heavy rain, or a case where some object hits the vehicle without any theft taking place. Such vibrations are detected in the same manner as a theft, and images are therefore recorded into the recording medium for a predetermined time. Since images are captured for a predetermined time period and the captured images are recorded into the recording medium even when there is no theft as described above, a large number of images that are unrelated to a theft are recorded into the recording medium owing to erroneous detections in a case where a vehicle is parked for a long period of time and the IG switch is off. Accordingly, the recording capacity for images that should be recorded during driving conditions is reduced, so there is the possibility that no image can be recorded when an accident occurs.

SUMMARY OF THE INVENTION

It is therefore an object of the invention to provide an information recording apparatus capable of inhibiting unnecessary recording into a recording portion while saving power consumption, in the case of using an image shooting function or a sound collection function to record images or sound captured when an abnormal condition such as a theft occurs.

The invention provides an information recording apparatus comprising:

a storage portion which stores thereinto at least one of image and sound information in the interior or exterior of a vehicle which information is acquired by an acquisition portion, an abnormal condition detection portion that detects the presence of an abnormal condition of the vehicle based on a signal from a sensor that detects an abnormal condition, a recording portion which records thereinto the information stored in the storage portion, a control portion that causes the storage portion to store thereinto the information acquired by the acquisition portion for a first time period from detection of occurrence of an abnormal condition of the vehicle by the abnormal condition detection portion, and when the abnormal condition detection portion has detected an abnormal condition of the vehicle again during the first time period from the detection of occurrence of an abnormal condition of the vehicle, causes the storage portion to store thereinto the information acquired by the acquisition portion for a second time period that is longer than the first time period from a previous detection of occurrence of an abnormal condition of the vehicle, and causes the recording portion to record thereinto the information stored in the storage portion for the second time period.

According to the invention, the storage portion is caused to store thereinto information acquired by the acquisition portion only when the abnormal condition detection portion has detected an occurrence of an abnormal condition of the vehicle, i.e., when there is the possibility that a theft may occur, it is possible to save power consumption. Accordingly, battery exhaustion can be inhibited even in a situation in which a vehicle is parked for a long period of time and the battery mounted in the vehicle is not charged.

Furthermore, when the abnormal condition detection portion has detected occurrence of an abnormal condition of the vehicle, and the abnormal condition detection portion detects occurrence of abnormal condition of the vehicle again within the first time period from the aforementioned detection, the information stored in the storage portion is recorded into the recording portion, so that it is possible to prevent information from being recorded into the recording portion upon detection of an abnormal condition of the vehicle that is not related to an abnormal condition of the vehicle such as a theft, rather than an abnormal condition of the vehicle that should be detected, such as a theft. Accordingly, it is possible to prevent unnecessary recording of information into the recording portion, thereby effectively utilizing the limited recording capacity of the recording portion. Since unnecessary recording of information into the recording portion is prevented, it is possible to prevent such a problem that there is no free space when an actual theft has occurred, even after a vehicle is parked for a long period of time. When a theft has occurred, the reliability for recording image and sound information relating to the theft and a preparation of the theft can be increased.

Furthermore, since at least one of image and sound information is recorded also for a theft preparation before a theft is carried out, the recorded information can facilitate identification of the criminal, and also can contribute to knowing the method employed in the criminal act.

BRIEF DESCRIPTION OF THE DRAWINGS

Other and further objects, features, and advantages of the invention will be more explicit from the following detailed description taken with reference to the drawings wherein:

FIGS. 12A to 12D are timing charts schematically illustrating how the image information and the sound information are stored into a second RAM, or recorded into the nonvolatile ROM by the operation described above;

FIGS. 13 and 14 are flowcharts illustrating an operation performed when the anti-theft CPU in the anti-theft device of an information recording apparatus according to a second embodiment of the invention executes the control program stored in the anti-theft ROM;

FIG. 15 is a flowchart illustrating an operation performed when the anti-theft CPU in the anti-theft device of an information recording apparatus according to a third embodiment of the invention executes the control program stored in the anti-theft ROM;

FIGS. 23 to 26 are flowcharts illustrating an operation performed when a drive recorder CPU executes the control program stored in the nonvolatile ROM.

DETAILED DESCRIPTION

Figure 1:
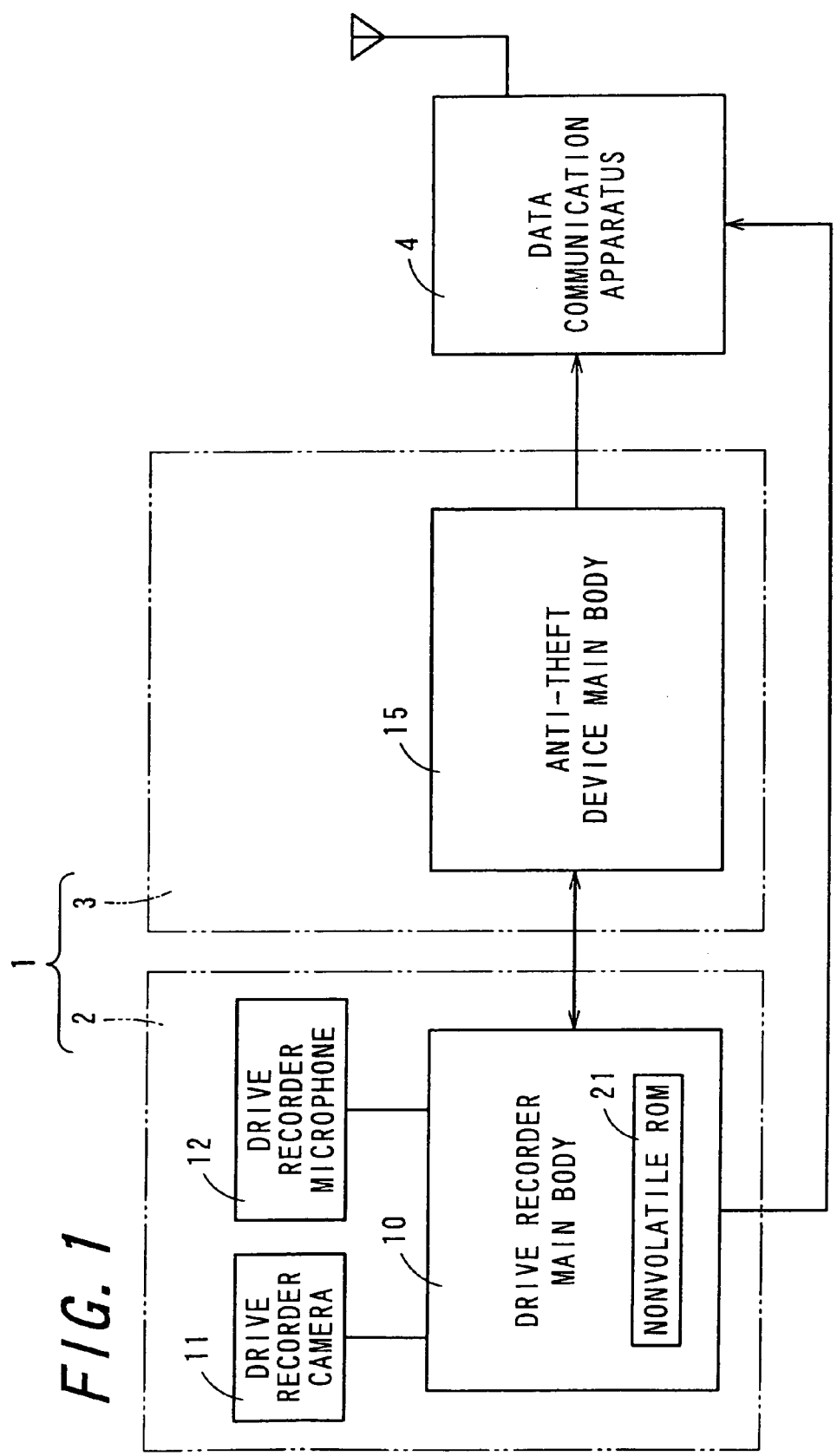
FIG. 1 is a diagram schematically showing the configuration of an information recording apparatus according to a first embodiment of the invention.

Now referring to the drawings, preferred embodiments of the invention will be described in detail.

In the following description, those parts that have been described in the preceding embodiment are denoted by identical reference numerals, and their overlapping description may be omitted. In a case where only a part of a configuration is described, the rest of the configuration is the same as the preceding embodiment.

FIG. 1 is a diagram schematically showing the configuration of an information recording apparatus 1 according to a first embodiment of the invention. The information recording apparatus 1 includes a drive recorder 2 and an anti-theft device 3 serving as a security device. The information recording apparatus 1 is mounted, for example, in a vehicle such as a car. The drive recorder 2 and the anti-theft device 3 are electrically connected, and communicatively connected with each other. The drive recorder 2 and the anti-theft device 3 are electrically connected to a data communication apparatus 4 provided externally to the information recording apparatus 1.

The drive recorder 2 includes a drive recorder main body 10, a drive recorder camera 11 serving as an image pickup device, and a drive recorder microphone 12 serving as a sound acquisition device. The drive recorder camera 11 and the drive recorder microphone 12 are electrically connected to the drive recorder main body 10, and are provided separately from the drive recorder main body 10. When the vehicle is in operation, or more specifically, when an ignition (IG) switch is on or an accessory (ACC) switch is on, the drive recorder main body 10 causes a RAM (Random Access Memory), which is not shown in FIG. 1, to store thereinto image information representing an image captured by the drive recorder camera 11 and sound information representing sound collected by the drive recorder microphone 12 each time a predetermined time period has elapsed. Once an amount of the information corresponding to the storage capacity has been stored during storage of the image information and the sound information into the RAM, the storage area of the RAM in which the oldest information of the stored image information and sound information are located is overwritten with new image information and sound information. Thus, the image information and the sound information can be stored endlessly. In addition, when the vehicle is parked, the drive recorder main body 10 causes the RAM to store thereinto the image information representing an image captured by the drive recorder camera 11 and the sound information representing sound collected by the drive recorder microphone 12 in accordance with a command transmitted from the anti-theft device 3 (described later).

Although the following embodiments describe a case where the drive recorder main body 10 causes the RAM to store thereinto both of the image information representing an image captured by the drive recorder camera 11 and sound information representing sound collected by the drive recorder microphone 12, one of the image information and the sound information may be stored.

Upon detection of a predetermined trigger, including, for example, a predetermined impact applied to the vehicle when the vehicle is in operation, or more specifically, when the ignition (IG) switch is on or the accessory (ACC) switch is on, the drive recorder main body 10 causes a recording medium, or more specifically a nonvolatile memory to record thereinto the image information and sound information stored in the RAM.

The drive recorder main body 10 includes a nonvolatile ROM 21. The nonvolatile ROM 21 may be implemented, for example, by a Flash ROM (Flash Read Only Memory; abbreviated as F-ROM). Upon detection of occurrence of an abnormal condition such as a theft (described later) of the vehicle when the vehicle is parked, or more specifically, when the IG switch is off or the ACC switch is off, the drive recorder main body 10 acquires the image information and the sound information for a first time period from detection of occurrence of an abnormal condition of the vehicle, and causes the RAM to store the information thereinto. In a case where occurrence of an abnormal condition of the vehicle is detected again within the first time period from the detection of occurrence of an abnormal condition of the vehicle, the drive recorder main body 10 acquires the image information and the sound information for a second time period that is longer than the first time period from the previous detection of occurrence of an abnormal condition of the vehicle, and causes the RAM to store the information thereinto. Furthermore, the drive recorder main body 10 causes the nonvolatile ROM 21 to record thereinto the image information and sound information stored in the RAM for the second time period, and supplies the information to the data communication apparatus 4. The image information and sound information supplied to the data communication apparatus 4 are transmitted to an external communication apparatus such as a mobile phone device or center equipment via wireless communication.

When the vehicle is parked, the drive recorder main body 10 causes the RAM (not shown) to store thereinto the image information and the sound information in accordance with the security status of the vehicle that has been determined by an anti-theft device main body (described later). The security status is an alert status, a preliminary alarm status, or an alarm status. The details of the alert status, the preliminary alarm status, and the alarm status will be described later.

An anti-theft device main body 15 determines whether the security status of the vehicle is the alert status, the preliminary alarm status, or the alarm status, and transmits a signal representing the determined security status to the drive recorder 2.

Figure 2:
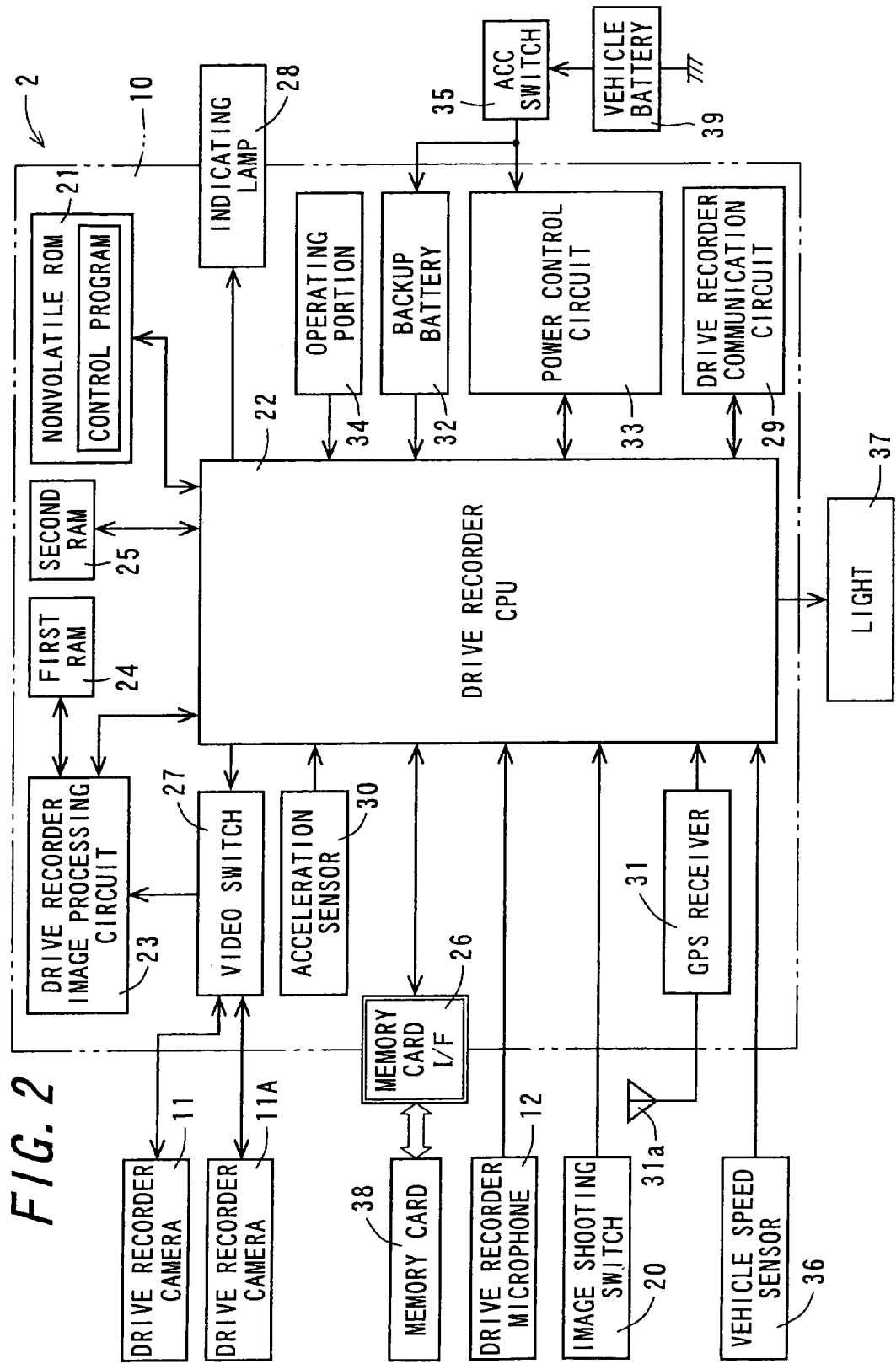
FIG. 2 is a block diagram showing an electrical configuration of a drive recorder.

FIG. 2 is a block diagram showing an electrical configuration of the drive recorder 2. The drive recorder 2 includes the drive recorder main body 10, two drive recorder cameras 11 and 11A, and the drive recorder microphone 12. The drive recorder cameras 11 and 11A may be implemented by a CCD (Charge Coupled Device) camera. The drive recorder camera 11 is attached, for example, to the windshield behind the rearview mirror via a bracket in order to capture an image in the front direction from the vehicle. That is, the drive recorder camera 11 is provided such its image shooting direction is fixed to the front direction from the vehicle. The drive recorder camera 11A is fixed at a position from which an image of the interior of the vehicle can be captured in order to capture an image of the interior of the vehicle. A camera for capturing an image of the rear of the vehicle, in addition to capturing an image of the front and the interior of the vehicle, may also be provided as the drive recorder camera 11.

An image shooting switch 20 for capturing images with a plurality of drive recorder cameras 11 and 11A are electrically connected to the drive recorder main body 10. By manipulating the image shooting switch 20, the image information acquired from at least one of the drive recorder cameras 11 and 11A can be recorded into a memory card 38 for a predetermined time. Although the image shooting switch 20 is provided separately from the drive recorder main body 10, the image shooting switch 20 may be provided integrally with the drive recorder main body 10.

The drive recorder microphone 12 is provided separately from the drive recorder main body 10, and is provided at a position at which at least sound in the interior of the vehicle can be collected. The drive recorder cameras 11 and 11A and the drive recorder microphone 12 may be provided in the same casing as the drive recorder main body 10, instead of being provided separately from the drive recorder main body 10. The drive recorder cameras 11 and 11A and the drive recorder microphone 12 are operated by supplying power thereto from the drive recorder main body 10.

The drive recorder main body 10 includes a nonvolatile ROM 21, a drive recorder CPU (Central Processing Unit) 22, a drive recorder image processing circuit 23, a first RAM 24, a second RAM 25, a memory card interface (abbreviated as memory card I/F) 26, a video switch 27, an indicating lamp 28, a drive recorder communication circuit 29, an acceleration sensor (hereinafter, occasionally referred to as "G sensor") 30, a GPS (Global Positioning System) receiver 31, a backup battery 32, a power control circuit 33, and an operating portion 34.

The nonvolatile ROM 21 records therein a control program for collectively controlling the hardware resources constituting the drive recorder main body 10. When the IG switch is off or the ACC switch 35 is off and an alarm status signal indicating that the security status is the alarm status, i.e., the state in which an anti-theft process such as alarming is performed upon detection of an illegal intrusion into the vehicle by a third party other than the user of the vehicle, or in other words, a theft, has been received by the drive recorder communication circuit 29 from the anti-theft device 3 (described later), the image information captured by the drive recorder camera 11 before and after the establishment of the alarm status and the sound information collected by the drive recorder microphone 12 before and after the establishment of the alarm status are recorded into the nonvolatile ROM 21.

The drive recorder CPU 22 collectively controls the nonvolatile ROM 21, the drive recorder image processing circuit 23, second RAM 25, the memory card I/F 26, the video switch 27, the indicating lamp 28, the drive recorder communication circuit 29, and the power control circuit 33 described above, which constitute the drive recorder main body 10, by executing the control program stored in the nonvolatile ROM 21. The nonvolatile ROM 21, the drive recorder image processing circuit 23, the second RAM 25, the memory card I/F 26, the video switch 27, the indicating lamp 28, the drive recorder communication circuit 29, the G sensor 30, the GPS receiver 31, the backup battery 32, the power control circuit 33, the drive recorder microphone 12, the image shooting switch 20, a vehicle speed sensor 36, and a light 37 are electrically connected to the drive recorder CPU 22.

The drive recorder CPU 22 sums up vehicle speed pulse signals supplied from the vehicle speed sensor 36, and specifies the traveling speed of the vehicle (hereinafter, referred to as "vehicle speed"). In the case of capturing an image of the interior of the vehicle by the drive recorder camera 11A provided for capturing an image of the interior of the vehicle, the drive recorder CPU 22 causes the light 37 for illuminating the vehicle interior to turn on, which may be implemented, for example, by a light emitting diode (abbreviated as LED).

In addition, the drive recorder CPU 22 has a timer function, and can measure the time. The drive recorder CPU 22 can perform a plurality of time measurements in parallel, i.e., can operate as a plurality of timers in parallel.

The drive recorder CPU 22 also includes an internal memory that stores configuration information. This internal memory is provided with a first flag storage area storing "image and sound information storage permission flag into the second RAM 25" indicating whether storage into the second RAM 25 is permitted, a time storage area storing information relating to the time period during which the information is stored in the second RAM 25, and a second flag storage area storing "image and sound information recording permission flag into the nonvolatile ROM 21" indicating whether recording into the nonvolatile ROM 21 is permitted.

The drive recorder image processing circuit 23 may be implemented, for example, by a JPEG IC (JPEG: Joint Photographic coding Experts Group, IC: Integrated Circuit). The drive recorder image processing circuit 23 converts an image that has been captured by the drive recorder cameras 11 and 11A and inputted to the drive recorder main body 10 into image information in a JPEG format.

The first RAM 24 and the second RAM 25 may be implemented, for example, by an SD-RAM (Synchronous Dynamic Random Access Memory). The first RAM 24 temporarily stores the image information that has been converted into a JPEG format by the drive recorder image processing circuit 23.

The second RAM 25 is constituted by a ring buffer memory. A G sensor output value that is detected by the acceleration sensor 30 (described later) and specified by the drive recorder CPU 22, and vehicle speed information representing the vehicle speed specified by the drive recorder CPU 22 based on the vehicle speed pulse signal outputted from the vehicle speed sensor 36, the image information that has been converted into a JPEG format by the drive recorder image processing circuit 23, and the sound information representing sound collected by the drive recorder microphone 12, vehicle position information representing the position of the vehicle that has been specified by the drive recorder CPU 22 based on a plurality of radio signals supplied by the GPS receiver 31, and so on are endlessly stored into the second RAM 25.

When the IG switch is off or the ACC switch 35 is off and the security status notified from the anti-theft device 3 (described later) is the preliminary alarm status (preliminary alarm mode) or the alarm status (alarm mode), i.e., a preliminary alarm status signal indicating the state in which there is the possibility that an abnormal condition such as an illegal intrusion into the vehicle by a third party other than the user or a theft may occur, or an alarm status signal indicating the state in which a theft has occurred has been received by the drive recorder communication circuit 29, the image information captured by the drive recorder camera 11 and the sound information collected by the drive recorder microphone 12 are stored into the second RAM 25.

The drive recorder main body 10 is configured to be able to access, via the memory card I/F 26, the memory card 38 (for example, a compact flash (registered trademark) card (hereinafter, occasionally referred to as "CF card") that is removably attached to the drive recorder main body 10. The memory card 38 that is removably attached to the drive recorder main body 10 is not limited to the CF card described above, and may be an SD (Secure Digital) memory card, a memory stick, and a smart media card, for example. In the following description, the CF card is denoted by reference numeral "38", which is identical to that denotes the memory card.

The video switch 27 is a switch for performing switching between the plurality of drive recorder cameras 11 and 11A to be used for image capturing with a predetermined time interval in a case where the plurality of drive recorder cameras 11 and 11A are provided.

The indicating lamp 28 may be implemented, for example, by an LED. At the time of occurrence of a failure of the acceleration sensor 30, a failure of the drive recorder image processing circuit 23, a camera connection failure such as a state in which the drive recorder camera 11 and the drive recorder main body 10 are not electrically connected, or a state in which the drive recorder camera 11 and the drive recorder image processing circuit 23 are disconnected, or a hardware failure such as disconnection between the drive recorder image processing circuit 23 and the drive recorder CPU 22, the indicating lamp 28 lights only for a predetermined time, or flashes with a predetermined flashing cycle in accordance with a command from the drive recorder CPU 22. The indicating lamp 28 may be implemented by a number of LEDs that corresponds to the number of types of the abnormal failures described above, or may be implemented by a number of LEDs that is less than the number of the types of the failures. In the former case, the user can immediately recognize the type of the failure from the LEDs are lighting or flashing. In the latter case, by changing the pattern of flashing depending on the type of the failure by the drive recorder CPU 22, the user can immediately recognize the type of the failure from the type of the flashing pattern. Accordingly, the number of the LEDs can be reduced, thereby realizing a compact recorder main body 10.

The drive recorder communication circuit 29 functions as a communication interface for communicatively connecting with the anti-theft device main body 15 and the data communication apparatus 4.

The G sensor 30 is capable of detecting a so-called G sensor output value, acceleration of gravity acting in the front-rear directions and the left-right directions of the vehicle. The traveling directions of the vehicle are taken as the front-rear directions, one of which is the front and the other of which is the rear. The left and right directions towards the front of the vehicle are taken as the left-right directions. Directions that are orthogonal to the front-rear directions and the left-right directions are taken as the up-down directions. The front-rear directions are defined as Y-axis directions, and the left-right directions are defined as X-axis directions. The G sensor output values in the X-axis directions and the G sensor output values in the Y-axis directions are detected independently from one other. The G sensor 30 supplies a signal representing the detected G sensor output value in the X-axis directions and the Y-axis directions to the drive recorder CPU 22. The drive recorder CPU 22 specifies the G sensor output values in the X-axis directions and the Y-axis directions based on the signal representing the G sensor output value outputted from the G sensor 30.

The GPS receiver 31 receives a plurality of radio signals transmitted from GPS satellites (not shown) via a GPS antenna 31a. The GPS receiver 31 supplies the plurality of radio signals received to the drive recorder CPU 22. The drive recorder CPU 22 specifies the position of the vehicle based on the plurality of radio signals supplied from the GPS receiver 31.

In the drive recorder 2, power is constantly supplied to the backup battery 32 and the power control circuit 33 (described later) from a vehicle battery provided in the vehicle 39, regardless of whether the ACC switch 35 is on or off. When power is supplied from the vehicle battery 39, the backup battery 32 uses the supplied power to charge a capacitor contained therein. When power supply from the vehicle battery 39 has been stopped owing to a disconnection caused by an accident or the like, the backup battery 32 supplies power to the drive recorder CPU 22 by releasing the charges stored in the capacitor.

The power control circuit 33 may be implemented, for example, by a regulator. The power control circuit 33 converts a voltage of, for example, 12 volts (V) supplied from the vehicle battery 39 into a voltage of, for example, 5 volts (V) used for driving the drive recorder CPU 22, and supplies the converted voltage to the drive recorder CPU 22.

The operating portion 34 may be implemented by a switch, and a transfer command is supplied to the drive recorder CPU 22 by manipulating the operating portion 34. When a transfer command is supplied, the drive recorder CPU 22 transfers the image information and sound information recorded in the nonvolatile ROM 21 to the memory card 38 attached to the memory card I/F 26, and causes the memory card 38 to record the information thereinto. Upon completion of the transfer, the drive recorder CPU 22 erases the image information and sound information recorded in the nonvolatile ROM 21.

The drive recorder CPU 22 of this embodiment corresponds to the recorder side control portion. The nonvolatile ROM 21 corresponds to the recording portion, and the second RAM 25 corresponds to the storage portion. The acceleration sensor 30 corresponds to the impact sensor and the vibration sensor.

Figure 3:
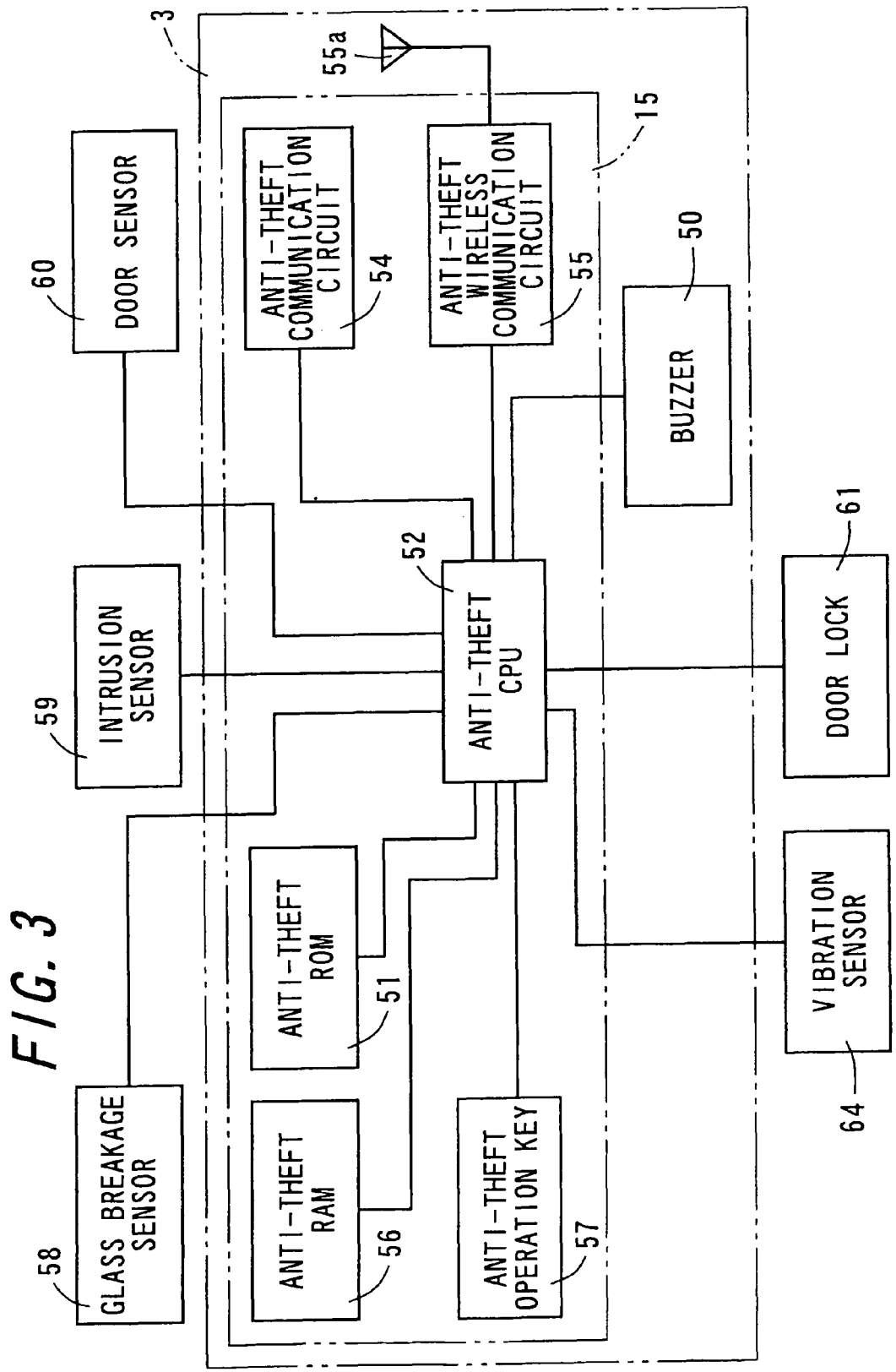
FIG. 3 is a block diagram showing an electrical configuration of an anti-theft device.

FIG. 3 is a block diagram showing an electrical configuration of the anti-theft device 3. The anti-theft device 3 includes the anti-theft device main body 15, a buzzer 50, and a radio antenna 55a. The anti-theft device main body 15 includes an anti-theft ROM 51, an anti-theft CPU 52, an anti-theft communication circuit 54, an anti-theft wireless communication circuit 55, an anti-theft RAM 56, and an anti-theft operation key 57.

The anti-theft ROM 51 may be implemented, for example, by an F-ROM. The anti-theft ROM 51 stores a control program for collectively controlling the hardware resources constituting the anti-theft device main body 15. The anti-theft ROM 51 also stores an anti-theft ID (Identification) code that is compared to a transmitter ID code transmitted from a transmitter 65 (described later).

The anti-theft CPU 52 collectively controls the anti-theft ROM 51, the anti-theft communication circuit 54, the anti-theft wireless communication circuit 55, the anti-theft RAM 56, and the anti-theft operation key 57 described above, which constitute the anti-theft device main body 15, by executing the control program stored in the anti-theft ROM 51. The anti-theft CPU 52 corresponds to a security side control portion.

The anti-theft ROM 51, the anti-theft communication circuit 54, the anti-theft wireless communication circuit 55, the anti-theft RAM 56, and the anti-theft operation key 57 are electrically connected to the anti-theft CPU 52. In addition, the buzzer 50 is electrically connected to the anti-theft CPU 52. The buzzer 50 is an alarm sound output device, and outputs an alarm sound when the anti-theft CPU 52 determines that the security status is the preliminary alarm status or the alarm status.

Furthermore, a glass breakage sensor 58 that detects breakage of glass from the sound of breaking glass of the vehicle, an intrusion sensor 59 that detects, using radio waves, an intrusion into the vehicle by a third party other than the user, i.e., a person who does not carry the transmitter 65 (described later), a door sensor 60 that detects the open/closed conditions of the vehicle doors, a vibration sensor 64 that detects vibrations of the vehicle are electrically connected to the anti-theft CPU 52. The glass breakage sensor 58, the intrusion sensor 59, the door sensor 60, and the vibration sensor 64 supply detection signals representing the detection results obtained by their respective sensors to the anti-theft CPU 52. The glass breakage sensor 58, the intrusion sensor 59, the door sensor 60 and vibration sensor 64 correspond to an abnormal condition detection portion.

Figure 6:
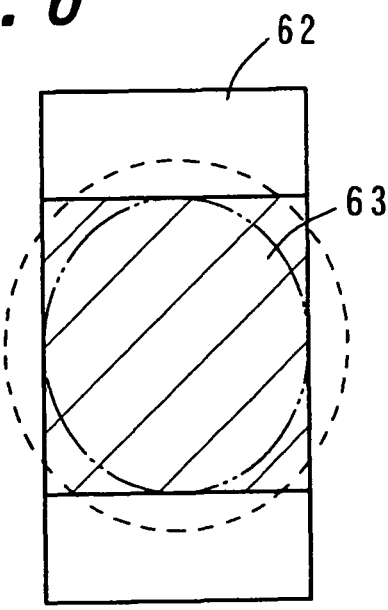
FIG. 6 is a diagram showing a detectable area of the intrusion sensor.

FIG. 6 is a diagram showing a detectable area of the intrusion sensor 59. The area of a vehicle 62 that is marked with diagonal lines is a compartment 63 of a vehicle. The detectable area of the intrusion sensor 59 is set such that the intrusion sensor 59 can detect a moving body in the compartment 63 of the vehicle. In this embodiment, the intrusion sensor 59 is implemented by a single-zone sensor. The detection area of the intrusion sensor 59 may only include the interior of the compartment 63 of the vehicle as the area encircled by the imaginary line shown in FIG. 6. In the portion at which the window glass is provided, the detection area may include the exterior of the vehicle compartment that surrounds the window glass as the area encircled by the dashed line shown in FIG. 6. In the portion at which the window grass is provided, it is more preferable that the detection area includes the vehicle exterior surrounding the window glass, since it is highly likely that a theft can be prevented by outputting an alarm sound from the buzzer 50 described above upon detection of a moving body by the intrusion sensor 59.

The anti-theft CPU 52 determines whether an abnormal condition in which the glass of the vehicle has been broken has been detected based on a detection signal supplied from the glass breakage sensor 58. The anti-theft CPU 52 determines whether an abnormal condition in which a third party other than the user has intruded into the vehicle has been detected based on a detection signal supplied from the intrusion sensor 59. The anti-theft CPU 52 determines whether an abnormal condition in which the vehicle door has been forcibly opened by a third party other than the user has been detected based on a detection signal supplied from the door sensor 60.

The anti-theft communication circuit 54 functions as a communication interface for communicatively connecting with the drive recorder main body 10 and the data communication apparatus 4. The anti-theft wireless communication circuit 55 functions as a communication interface for communicatively connecting with the transmitter 65 (described later) via a radio antenna 55a in a wireless manner.

The anti-theft RAM 56 functions as a working memory during operation of the anti-theft device 3, and stores set status information indicating whether the security status of the anti-theft device 3 is set to a non-alert status, the alert status, the preliminary alarm status, or the alarm status. The anti-theft CPU 52 can determine whether the security status is set to the non-alert status, the alert status, the preliminary alarm status, or the alarm status by reading out this set status information.

The anti-theft operation key 57 includes a plurality of operation input keys. By manipulating the operation input keys, a signal representing information corresponding to the manipulation, such as predetermined information, including, for example, number information, character information, and information indicating an instruction to the anti-theft device 3, is generated, and the signal is supplied to the anti-theft CPU 52. Accordingly, the user can input information to the anti-theft device 3 by manipulating the operation input keys the anti-theft operation key 57.

The vehicle is provided with a door lock portion 61 that locks and unlocks the door locks of the vehicle. The anti-theft CPU 52 receives a lock command signal or a unlock command signal (described later) transmitted from the transmitter 65. The anti-theft CPU 52 controls the door lock portion 61 to switch between the locked state and the unlocked state such that the door locks of the vehicle are brought into the locked state upon receipt of a lock command signal, and the doors lock of the vehicle is brought into the unlocked state upon reception of a unlock command signal. The door lock portion 61 also includes a lock detection sensor for detecting whether the door locks are in the locked state or in the unlocked state, and the lock detection sensor supplies a detection signal to the anti-theft CPU 52.

When a lock command signal is received by the anti-theft wireless communication circuit 55 together with a transmitter ID code (described later) transmitted from the transmitter 65, the anti-theft CPU 52 compares the anti-theft ID code stored in the anti-theft ROM 51 to the received transmitter ID code. When the two codes match, the anti-theft CPU 52 brings the door locks into the locked state, and sets the security status from the non-alert status to the alert status. In a case where the transmitter 65 is configured to transmit a security set command signal or a security reset command signal instead of the lock command signal or the unlock command signal, only the setting or canceling of the alert status is performed without performing the lock control for the door locks.

The anti-theft CPU 52 determines the security status of the vehicle, and effects transmission of the determined security status (in this embodiment, one of the non-alert status, the alert status, preliminary alarm status, and the alarm status) to the drive recorder 2 by the anti-theft communication circuit 54.

Figure 4:
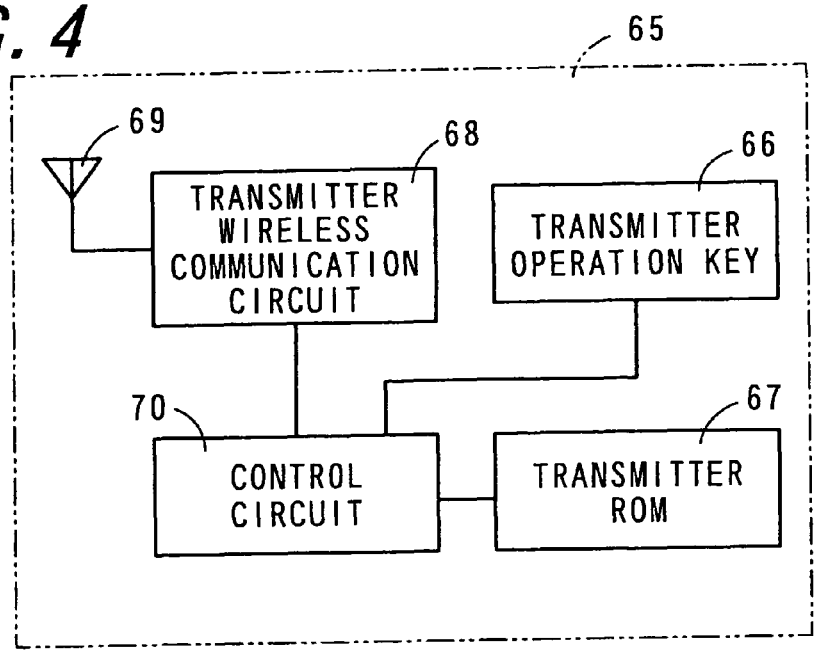
FIG. 4 is a block diagram showing an electrical configuration of a transmitter.

FIG. 4 is a block diagram showing an electrical configuration of the transmitter 65. The transmitter 65 includes a transmitter operation key 66, a transmitter ROM 67, a transmitter wireless communication circuit 68, a transmitter antenna 69, and a control circuit 70. The transmitter operation key 66 has a plurality of operation keys. By manipulating the operation keys, a lock command for locking all the door locks of the vehicle and a unlock command for unlocking all the door locks of the vehicle can be inputted. In the case of omitting the lock control function, the security set command and the security reset command are inputted.

The transmitter ROM 67 stores a control program for operating the transmitter 65. The transmitter ROM 67 also stores a transmitter ID code that is compared to the anti-theft ID code stored in the anti-theft ROM 51 of the anti-theft device 3.

The transmitter wireless communication circuit 68 functions as a communication interface for communicatively connecting with the anti-theft device 3 via the transmitter antenna 69 in a wireless manner.

The control circuit 70 is constituted by a CPU or the like. The control circuit 70 controls the transmitter wireless communication circuit 68, which constitutes the transmitter 65, in accordance with the control program stored in the transmitter ROM 67. When the lock command or the unlock command is inputted with the transmitter operation key 66, the control circuit 70 transmits a lock command signal representing the lock command or a unlock command signal representing the unlock command, together with the transmitter ID code, to the anti-theft device 3 by the transmitter wireless communication circuit 68 and the transmitter antenna 69.

Figure 5:
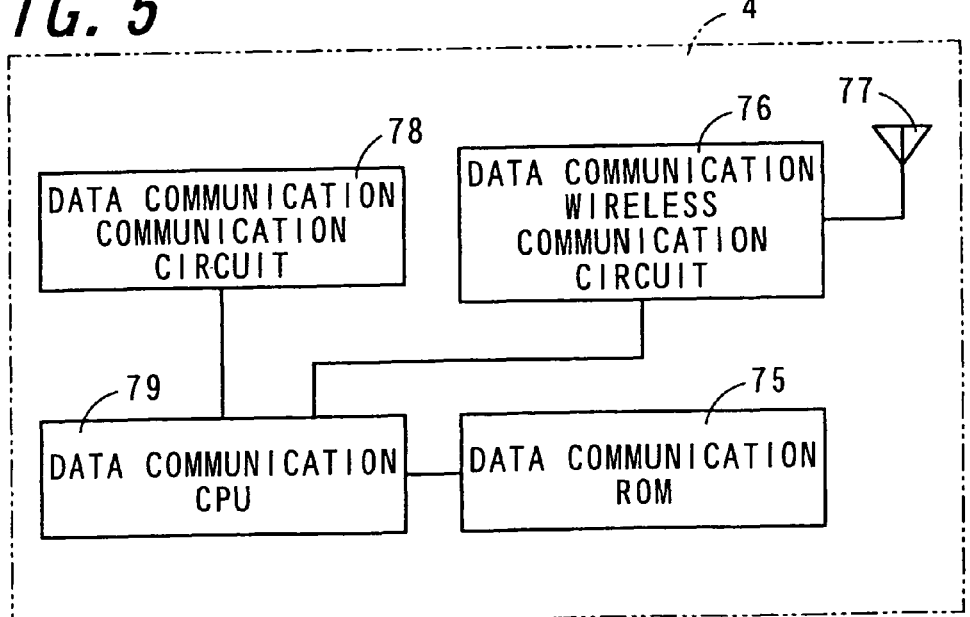
FIG. 5 is a block diagram showing an electrical configuration of a data communication apparatus.

FIG. 5 is a block diagram showing an electrical configuration of the data communication apparatus 4. The data communication apparatus 4 includes a data communication ROM 75, a data communication wireless communication circuit 76, a data communication antenna 77, a data communication circuit 78, and a data communication CPU 79.

The data communication ROM 75 stores a control program for operating the data communication apparatus 4. The data communication wireless communication circuit 76 functions as a communication interface for communicatively connecting with an external communication apparatus such as a mobile phone device and center equipment via the data communication antenna 77 in a wireless manner.

The data communication circuit 78 functions as a communication interface for communicatively connecting with the drive recorder 2 and the anti-theft device 3.

The data communication CPU 79 controls the data communication wireless communication circuit 76 and the data communication circuit 78, which constitute the data communication apparatus 4, by executing the control program stored in the data communication ROM 75.

When the image information and sound information transmitted from the drive recorder 2 are received by the data communication circuit 78, the data communication CPU 79 effects transmission of the received information to the external communication apparatus by the data communication wireless communication circuit 76 and the data communication antenna 77.

Figure 7:
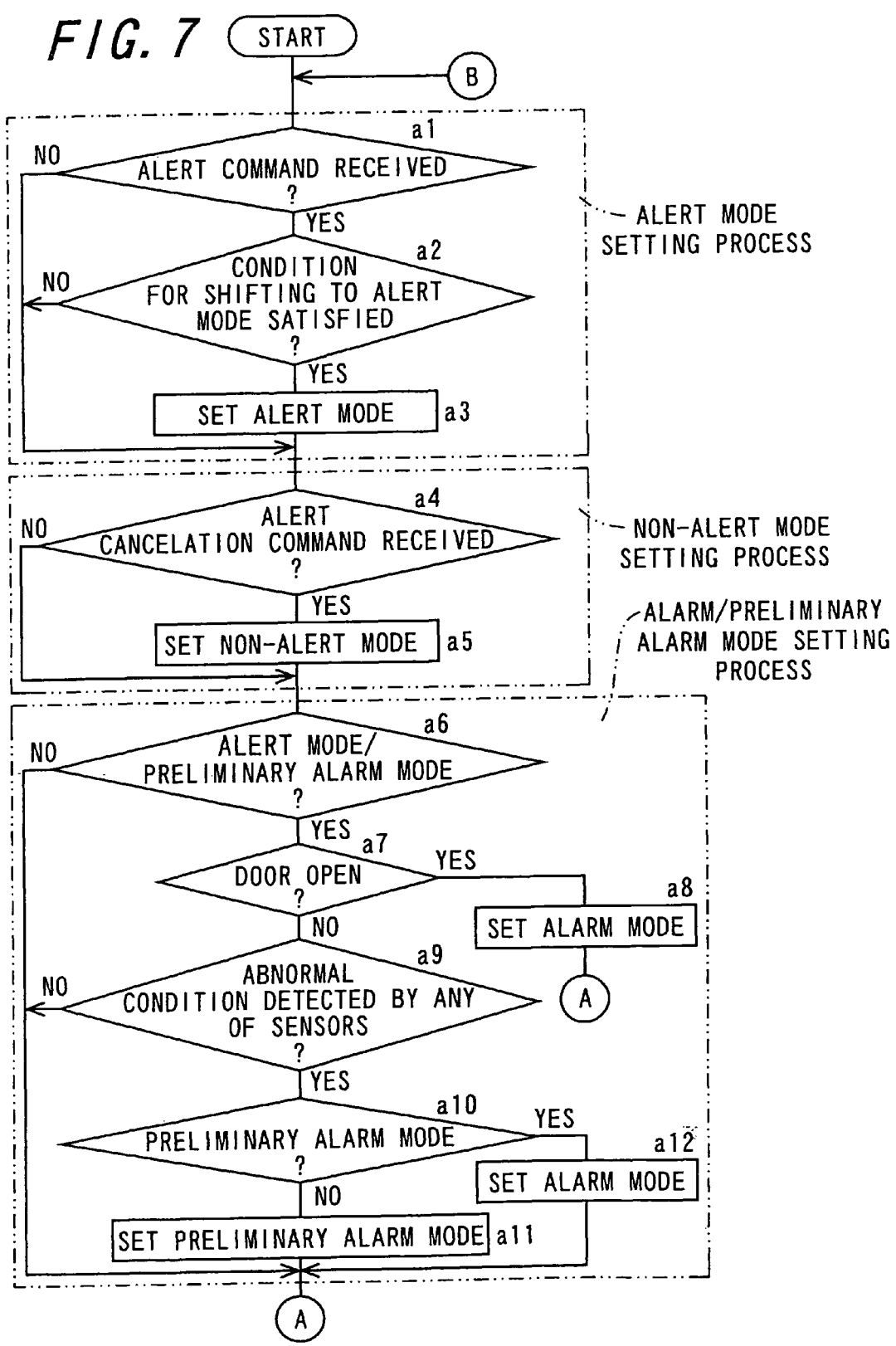
FIGS. 7 and 8 are flowcharts illustrating an operation performed when an anti-theft CPU executes the control program stored in an anti-theft ROM.
Figure 8:
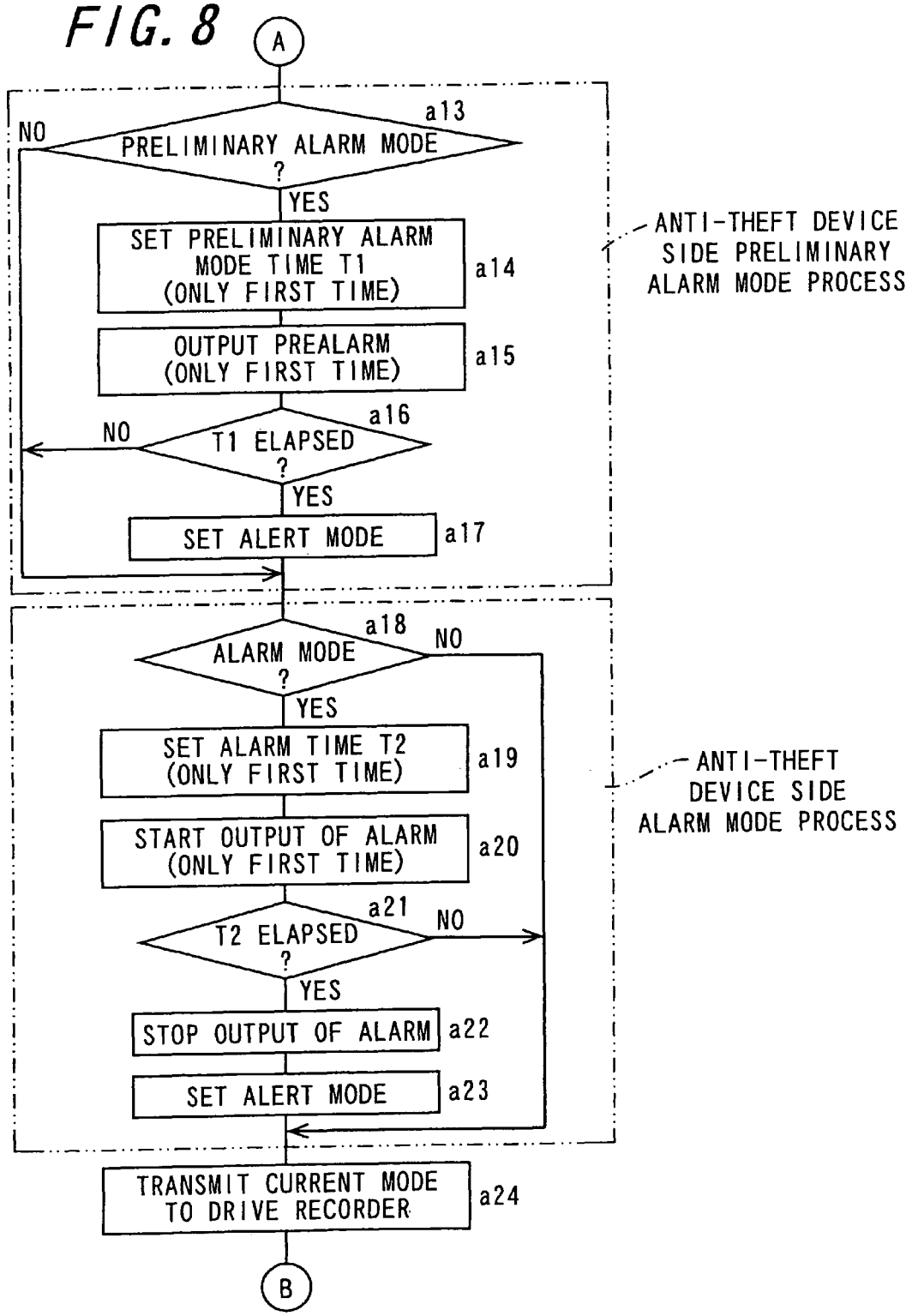

FIGS. 7 and 8 are flowcharts illustrating an operation performed when the anti-theft CPU 52 executes the control program stored in the anti-theft ROM 51. Hereinafter, the lock command signal and the set command signal are collectively referred to as "alert command", and the unlock command signal and the reset command signal are collectively referred to as "alert cancelation command".

When power is supplied to the anti-theft CPU 52, the procedure proceeds to step a1, and the process is commenced. In step a1, the anti-theft CPU 52 determines whether an alert command has been received by the anti-theft wireless communication circuit 55 together with the transmitter ID code that matches the anti-theft ID code. If it is determined in step a1 that the alert command has been received together with the transmitter ID code that matches the anti-theft ID code, the procedure proceeds to step a2 in order to perform the process for shifting to a mode in which theft monitoring is performed. In step a2, the anti-theft CPU 52 determines whether the condition for shifting to the alert mode is satisfied based on detection signals from the door sensor 60 and the door lock portion 61. In this embodiment, the condition for shifting to the alert mode is that all the doors provided in the vehicle are closed, and the door locks are locked. If it is determined in step a2 that the condition for shifting to the alert mode is satisfied, the procedure proceeds to step a3, in which the anti-theft CPU 52 sets the alert mode, i.e., causes the anti-theft RAM 56 to store therein to information indicating that the security status is the alert status, and the procedure proceeds to step a4. If a negative determination is made in step a1 or a2, the procedure proceeds to step a4.

In step a4, the anti-theft CPU 52 determines whether an alert cancelation command has been received by the anti-theft wireless communication circuit 55 together with the transmitter ID code that matches the anti-theft ID code. If it is determined in step a4 that an alert cancelation command has been received together with the transmitter ID code that matches the anti-theft ID code, the procedure proceeds to step a5 in order to perform the process for shifting to a mode in which theft monitoring is not carried out. In step a5, the anti-theft CPU 52 sets the non-alert mode, i.e., causes the anti-theft RAM 56 to store thereinto information indicating that the security status is the non-alert status, and the procedure proceeds to step a6. If a negative determination is made in step a4, the procedure proceeds to step a6.

In step a6, the anti-theft CPU 52 determines whether the security status is the alert mode or the preliminary alarm mode, i.e., determines whether the security status stored in the anti-theft RAM 56 is the alert status or the preliminary alarm status. If it is determined in step a6 that the security status is the alert mode or the preliminary alarm mode, then it is determined that the mode has shifted to the mode in which theft monitoring is performed. The procedure then proceeds to step a7, in which the anti-theft CPU 52 determines whether any of the doors of the vehicle has been opened based on a detection signal from the door sensor 60. If it is determined in step a7 that any of the doors of the vehicle has been opened, then it is determined that an illegal intrusion into the vehicle has occurred, and the procedure proceeds to step a8. In step a8, the anti-theft CPU 52 sets the alarm mode, which is the mode for performing the alarm generation process, i.e., causes the anti-theft RAM 56 to store thereinto information indicating that the security status is the alarm status, in order to generate an alarm immediately, and the procedure proceeds to step a13. If a negative determination is made in step a6, it is determined that no illegal intrusion into the vehicle has occurred, and the procedure proceeds to step a9.

In step a9, the anti-theft CPU 52 determines whether an abnormal condition has been detected by any of the glass breakage sensor 58, the intrusion sensor 59, and the vibration sensor 64 based on detection signals from the glass breakage sensor 58, the intrusion sensor 59, and the vibration sensor 64. If it is determined in step a9 that an abnormal condition has been detected, then it is determined that the abnormal condition may lead to a theft, or is caused by a theft, and the procedure proceeds to step a10, in which the anti-theft CPU 52 determines whether the security status is the preliminary alarm mode, i.e., determines whether the security status stored in the anti-theft RAM 56 is the preliminary alarm status. If it is determined in step a10 that the security status is not the preliminary alarm mode, then it is determined that the abnormal condition has not led to a theft, but may lead to a theft, and the procedure proceeds to step a11, in which the anti-theft CPU 52 sets the preliminary alarm mode, i.e., causes the anti-theft RAM 56 to store thereinto information indicating that the security status is the preliminary alarm status, and the procedure then proceeds to step a13.

If it is determined in step a10 that the security status is the preliminary alarm mode, this indicates that the second abnormal condition has been detected in the preliminary alarm status, so that it is determined that the abnormal condition is an actual theft, and the procedure proceeds to step a12. In step a12, the anti-theft CPU 52 sets the alarm mode, i.e., causes the anti-theft RAM 56 to store thereinto information indicating that the security status is the alarm status, and the procedure proceeds to step a13. If a negative determination is made in step a9, it is determined that the abnormal condition has not led to a theft, and the procedure proceeds to step a13.

In step a13, the anti-theft CPU 52 determines whether the security status is the preliminary alarm mode as in the process in step a10. If it is determined in step a13 that the security status is the preliminary alarm mode, the abnormal condition may lead to a theft, and the procedure proceeds to step a14 in order to perform a minor alarm process for preventing the theft, as opposed to an alarm process performed in steps a19 and a20 when a theft has occurred (described later). In step a14, the anti-theft CPU 52 sets a time period T1 during which an alarm sound is outputted in the preliminary alarm mode, i.e., causes the anti-theft RAM 56 to store thereinto information representing the time period T1 during which an alarm sound is outputted in the preliminary alarm mode, and the procedure proceeds to step a15. In step a15, the anti-theft CPU 52 causes the buzzer 50 to output an alarm sound as a prealarm for the time period T1, and the procedure proceeds to step a16. In a case where the process in which the procedure proceeds to step a14 is successively performed in the determination process in step a13, the processes of steps a14 and a15 are performed only the first time that the procedure proceeds to step a14 or a15. The time period T1 may be, for example, 10 seconds, and may be any period of time that is shorter than the alarm time in step a19 (described later). If a negative determination is made in step a13, the procedure proceeds to step a18.

In step a16, the anti-theft CPU 52 determines whether the time period T1 has elapsed from the time period T1 was set. If it is determined in step a16 that the time period T1 has elapsed, then it is determined that the possibility that the abnormal condition may lead to a theft has been eliminated, and the procedure proceeds to step a17. In step a17, the anti-theft CPU 52 sets the alert mode again, i.e., causes the anti-theft RAM 56 to store thereinto information indicating that the security status is the alert status, and the procedure proceeds to step a18. If a negative determination is made in step a16, it is determined that the state in which the abnormal condition may lead to a theft continues, and the procedure proceeds to step a18.

In step a18, the anti-theft CPU 52 determines whether the security status is the alarm mode. If it is determined in step a18 that the security status is the alarm mode, the abnormal condition is an actual theft, and the procedure proceeds to step a19 in order to perform the process for intimidating the burglar and informing the surrounding area with an alarm sound. In step a19, the anti-theft CPU 52 sets a time period T2 during which an alarm sound is outputted in the alarm mode, i.e., causes the anti-theft RAM 56 to store thereinto information representing the time period T2 during which an alarm sound is outputted in the alarm mode. The procedure then proceeds to step a20, in which the anti-theft CPU 52 causes the buzzer 50 to start outputting an alarm sound as an alarm, and the procedure then proceeds to step a21. If the anti-theft CPU 52 determines in step a21 that the time period T2 has elapsed from the time period T2 was set, the procedure proceeds to step a22, in which the anti-theft CPU 52 stops output of the alarm, i.e., stops the alarm sound outputted from the buzzer 50. The procedure then proceeds to step a23, in which the anti-theft CPU 52 sets the alert mode again, i.e., causes the anti-theft RAM 56 to store thereinto information indicating that the security status is the alert status, and the procedure proceeds to step a24. If a negative determination is made in step a18 or a21, the procedure proceeds to step a24. In a case where the process in which the procedure proceeds to step a19 is successively performed in the determination process in step a18, the processes of steps a19 and a20 are performed only the first time that the procedure proceeds to step a19 or a20. The time period T2 may be, for example, 30 seconds.

In step a24, the anti-theft CPU 52 notifies the drive recorder of the current security status (mode), i.e., effects transmission of a mode signal representing the current security status from the anti-theft communication circuit 54, and the procedure proceeds to step a1.

The processes from steps a1 to a3 are referred to as "alert mode setting process", the processes of steps a4 and a5 are referred to as "non-alert mode setting process", the processes from steps a6 to a11 are referred to as "alarm/preliminary alarm mode setting process", the processes from steps a13 to a17 are referred to as "anti-theft device side preliminary alarm mode process", and the processes from steps a18 to a23 are referred to as "anti-theft device side alarm mode processing".

Figure 9:
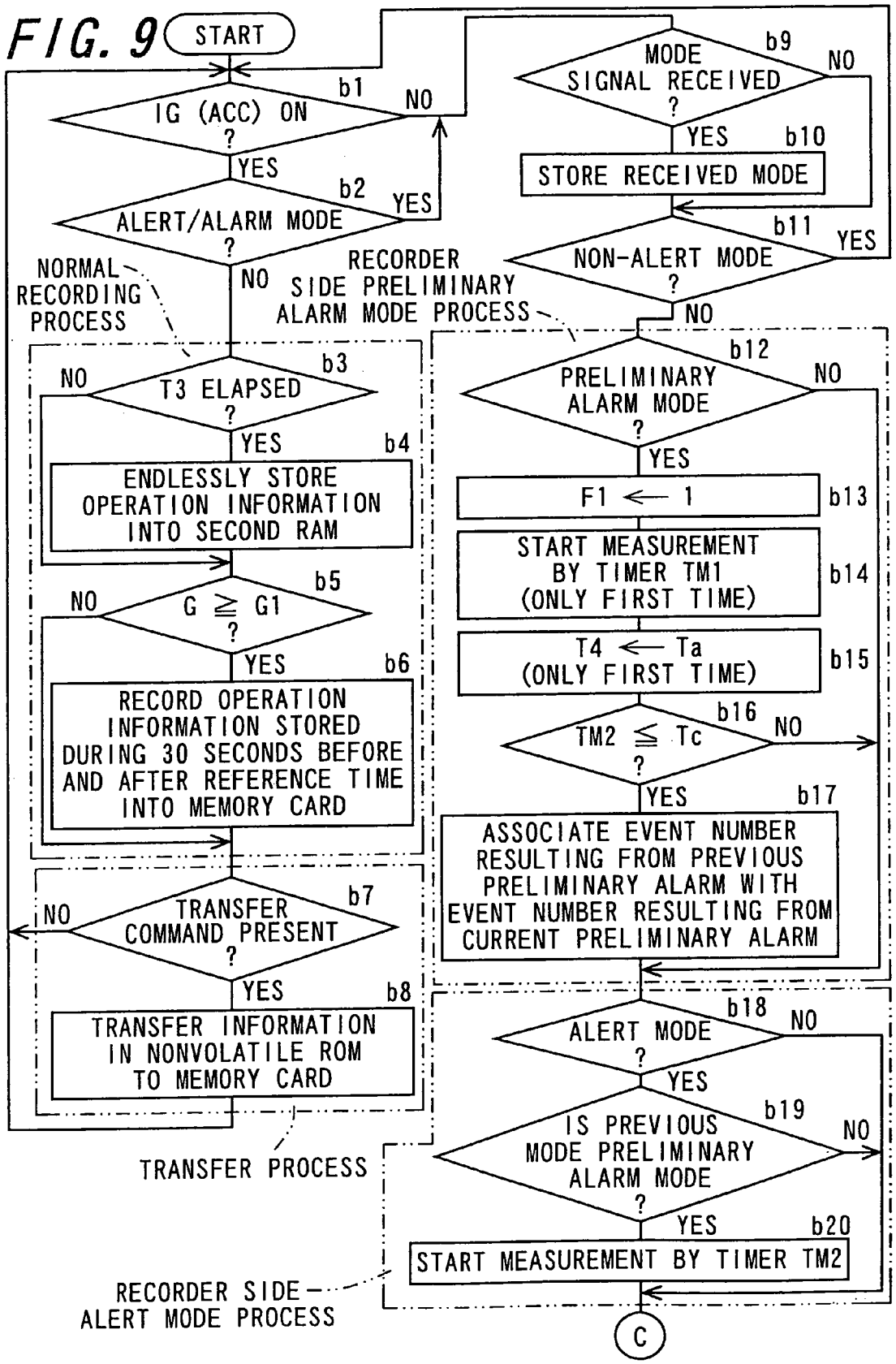
FIGS. 9 to 11 are flowcharts illustrating an operation performed when a drive recorder CPU executes a control program stored in the nonvolatile ROM.
Figure 10:
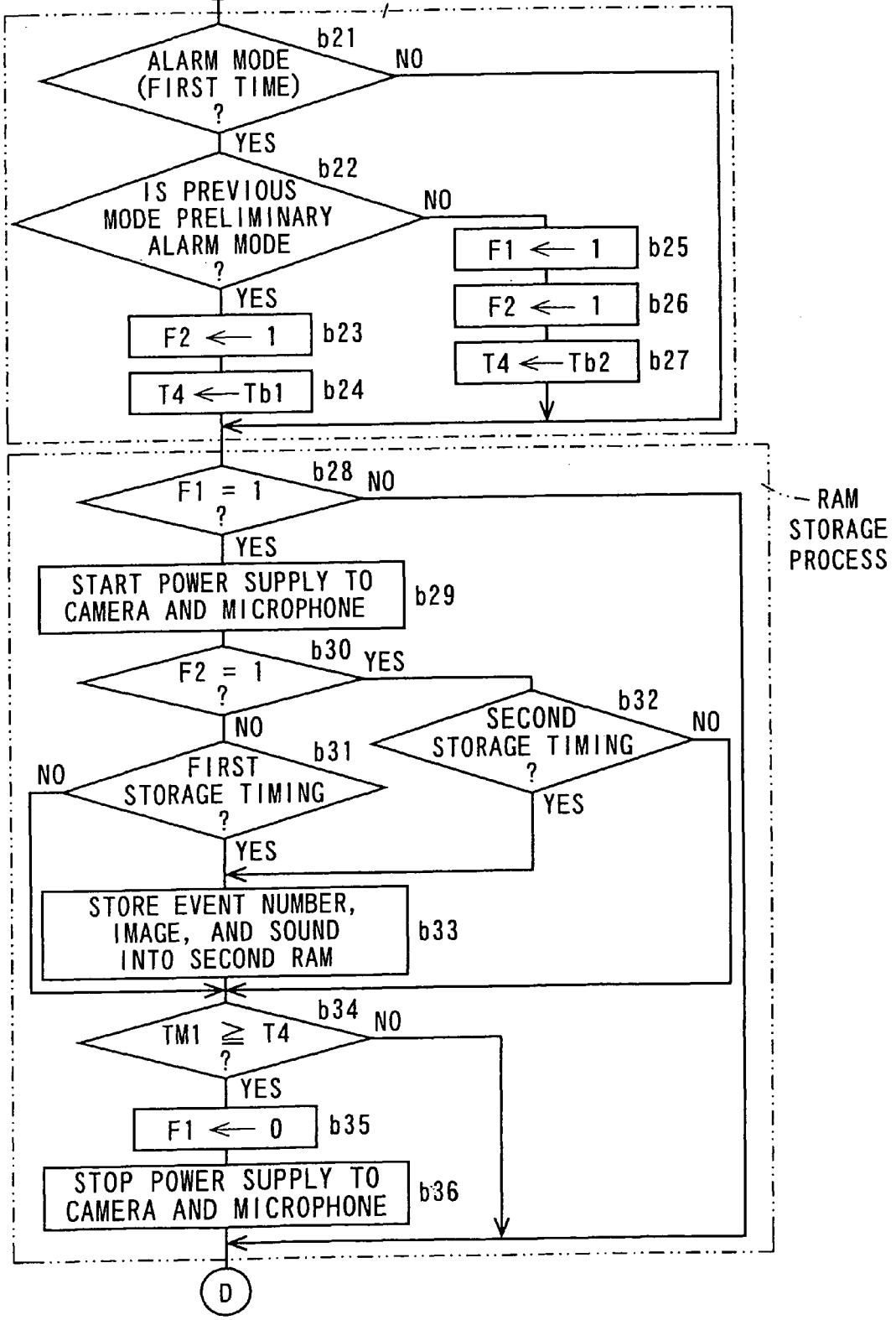
Figure 11:
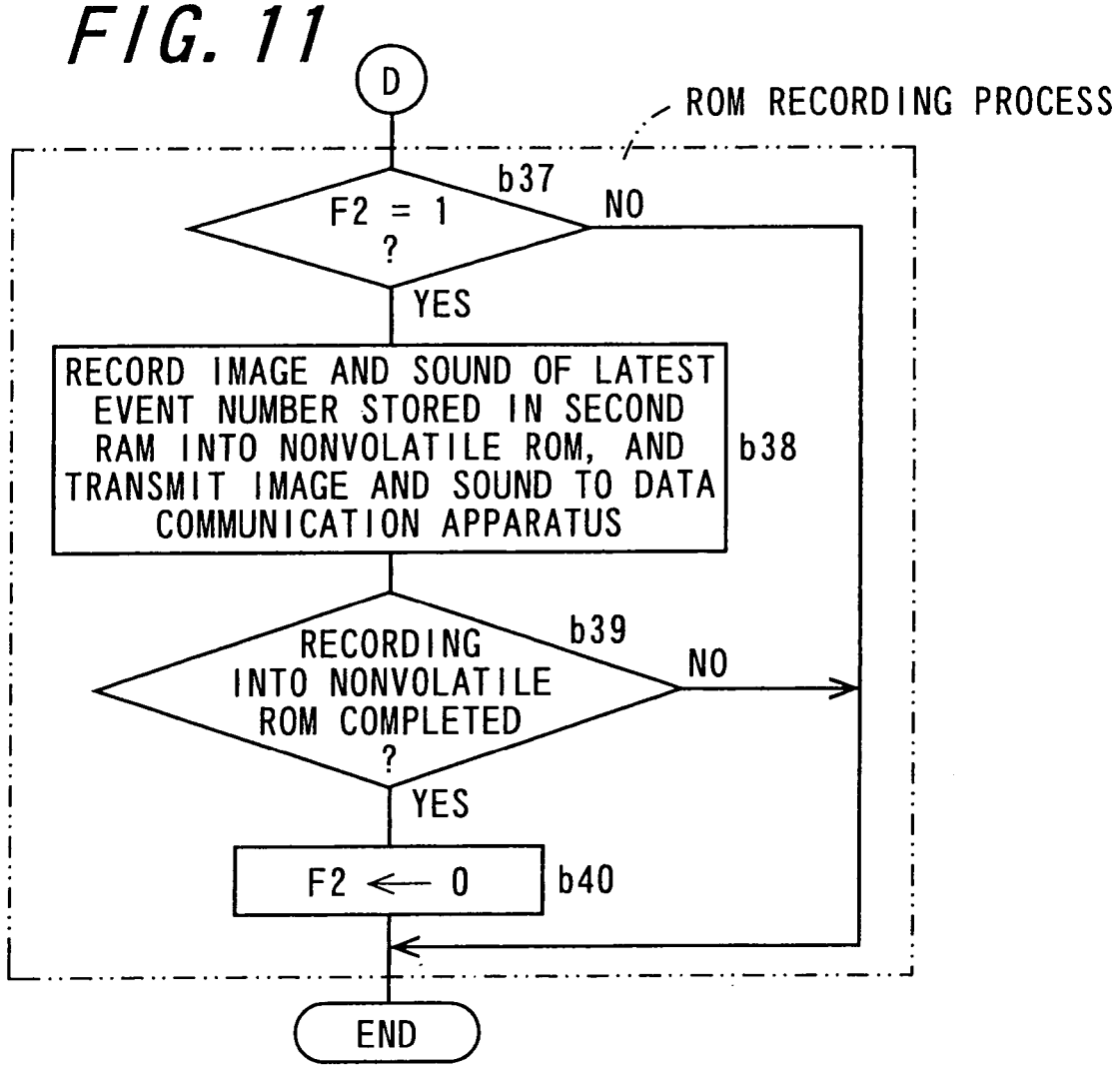

FIGS. 9, 10 and 11 are flowcharts illustrating an operation performed when the drive recorder CPU 22 executes the control program stored in the nonvolatile ROM 21. When power is supplied to the drive recorder CPU 22, the procedure proceeds to step b1, and the process is commenced. In step b1, the drive recorder CPU 22 determines whether the IG switch or the ACC switch is on. If it is determined in step b1 that the IG switch or the ACC switch is on, the procedure proceeds to step b2 in order to perform the recording process during driving conditions as an ordinary drive recorder. If it is determined that the IG switch or the ACC switch is not on, the procedure proceeds to step b9 in order to performing the theft monitoring process during non-driving conditions. When the IG switch or the ACC switch is turned on, power is supplied to the components of the recorder main body 10, the drive recorder cameras 11 and 11A and the drive recorder microphone 12, the image shooting switch 20, as well as the vehicle speed sensor 36.

In step b2, the drive recorder CPU 22 determines whether the current security status is the alert mode or the alarm mode based on information representing the current security status stored in second RAM 25 in step b10 (described below). If it is determined in step b2 that the current security status is the alert mode or the alarm mode, it can be determined that an illegal intruder has turned on the IG switch or the ACC switch, and the procedure proceeds to step b9 in order to perform the process during non-driving conditions.

If the drive recorder CPU 22 determines in step b2 that the current security status is neither the alert mode nor the alarm mode, the drive recorder CPU 22 determines that the vehicle is in a driving condition, and the procedure proceeds to step b3. Each time a time period T3 has elapsed, the procedure proceeds to step b4, in which the drive recorder CPU 22 causes the second RAM 25 to endlessly store operation information thereinto, and the procedure proceeds to step b5. The time period T3 can be set depending on how many of the images acquired by the drive recorder cameras 11 and 11A are recorded per unit time, and may be set, for example, to 100 milliseconds (ms) in the case of recording 10 images per second. However, when the process of step b3 is performed for the first time, it is determined that the time period T3 has not been elapsed. The operation information stored into the second RAM 25 in step b4 includes a G sensor output value specified by the drive recorder CPU 22, and vehicle speed information representing the vehicle speed specified by the drive recorder CPU 22 based on a vehicle speed pulse signal outputted from the vehicle speed sensor 36, the image information that has been converted into a JPEG format by the drive recorder image processing circuit 23, and the sound information representing sound collected by the drive recorder microphone 12, vehicle position information representing the position of the vehicle that has been specified by the drive recorder CPU 22 based on a plurality of radio signals supplied by the GPS receiver 31. If a negative determination is made in step b3, the procedure proceeds to step b5.

In step b5, the drive recorder CPU 22 determines whether the latest G sensor output value G stored in the second RAM 25, which has been specified based on the signal representing G sensor output value supplied from the G sensor 30, is equal to or more than a predetermined value G1. If it is determined that the value G is equal to or more than the predetermined value G1, then it is determined that an accident has occurred. Accordingly, the drive recorder CPU 22 takes the time point at which the G sensor output value G was determined as equal to or more than the predetermined value G1 as a reference time, and causes the memory card 38 to record thereinto the operation information stored in the second RAM 25 during 30 seconds before and after the reference time, and the procedure proceeds to step b7. The predetermined value G1 is selected to be an impact detection level that should be judged to correspond to an impact caused by an accident, and may be selected to be 0.5 G, for example. If a negative determination is made in step b5, the procedure proceeds to step b7.

In step b7, the drive recorder CPU 22 determines whether a transfer command has been supplied. If it is determined in step b7 that a transfer command has been supplied, the drive recorder CPU 22 transfers the image and sound information recorded into the nonvolatile ROM 21 upon detection of a theft to the memory card 38 attached to the memory card I/F 26, and causes the memory card 38 to record the information thereinto as will be described later. When the memory card 38 is not attached to the memory card I/F 26, a notification that the memory card 38 is not attached to the memory card I/F 26 may be provided, for example, by lighting or flashing the indicating lamp 28. Upon completion of the transfer, the transferred information is erased from the nonvolatile ROM 21. As will be described later, when a theft has been detected, the image and sound information are recorded into the nonvolatile ROM 21 contained in the drive recorder main body 10, instead of the memory card 38. This is to prevent the burglar from taking away the image and sound information recorded upon detection of a theft. However, when the image and sound information are recorded into the nonvolatile ROM 21, the valid user cannot check the recorded image and sound information after detection of a theft because the drive recorder main body 10 does not include a display device and a speaker device for outputting the image and sound information. Accordingly, the processes of steps b7 and b8 are provided to make it possible to transfer the image and sound information recorded upon detection of a theft to the memory card 38, and to confirm the information by reproducing that information with, for example, a personal computer including a display device and a speaker device. If a negative determination is made in step b7, the procedure proceeds to step b1.

In step b9, the drive recorder CPU 22 determines whether a mode signal from the anti-theft communication circuit 54 has been received by the drive recorder communication circuit 29. If it is determined in step b9 that the signal has been received, the procedure proceeds to step b10 in order to set the operation mode during non-driving conditions, or in other words, the operation mode of the anti-theft device main body 15. In step b10, the drive recorder CPU 22 causes the second RAM 25 to store thereinto the mode signal received in step b9 as information representing the current security status, and the procedure proceeds to step b11. If a negative determination is made in step b9, the procedure proceeds to step b11. Here, the received mode signal may be stored into the nonvolatile ROM 21, instead of the second RAM 25. By doing so, even if the burglar turns the IG switch on in an invalid manner in the alert mode or the alarm mode after temporarily removing the vehicle battery 39 and then connecting the vehicle battery 39 again, the procedure can proceed from step b2 to step b9 because the mode before the removal of the battery is stored. Accordingly, image shooting (described later) can be performed.

In step b11, the drive recorder CPU 22 determines whether the information representing the current security status stored in the security status storage area of the second RAM 25 is the non-alert mode, or in other words, represents the non-alert status. If it is determined in step b11 that the security status is the non-alert mode, the procedure proceeds to step b1. If it is determined that the information is not the non-alert mode, the procedure proceeds to step b12.

In step b12, the drive recorder CPU 22 determines whether the information representing the current security status is the preliminary alarm mode, or in other words, represents the preliminary alarm status. If it is determined in step b12 that the security status is the preliminary alarm mode, this indicates that an abnormal condition has occurred, and therefore, the procedure proceeds to step b13 in order to store the image and sound information into the second RAM 25. In step b13, "image and sound information storage permission flag F1 into the second RAM 25" stored in the first flag storage area of the internal memory is set to "1", and the procedure proceeds to step b14.

In step b14, the drive recorder CPU 22 effects start of time measurement by a timer TM1 for measuring the storage time period of the image and sound information into the second RAM 25, and the procedure proceeds to step b15. In step b15, the drive recorder CPU 22 sets a storage time period T4 of the image and sound information into the second RAM 25, which is stored in the time storage area of the internal memory, to a first time period Ta, and the procedure proceeds to step b16. Hereinafter, the time measured by the timer TM1 is referred to as "TM1". The first time period Ta may be 10 seconds, for example. In a case where the process in which the procedure proceeds to step b13 is successively performed in the determination process in step b12, the processes of steps b14 and b15 are performed only the first time that the procedure proceeds to step b14 or b15.

In step b16, the drive recorder CPU 22 determines whether a measured value TM2 of a timer TM2 for measuring the time elapsed from the end of the previous preliminary alarm mode is equal to or shorter than a third time period Tc. Here, the third time period Tc may be selected to be one minute, for example. If it is determined in step b16 that the measured value TM2 is equal to or shorter than the third time period Tc, the procedure proceeds to step b17. In step b17, since there is the possibility that the previous and current preliminary alarm modes are caused by a single theft, the drive recorder CPU 22 associates the event number corresponding to the image information and sound information stored when the previous preliminary alarm status was established with the event number corresponding to the image information and sound information stored when the current preliminary alarm status was established, and the procedure proceeds to step b18. If a negative determination is made in step b12 or b16, the procedure proceeds to step b18.

In step b18, the drive recorder CPU 22 determines whether the information representing the current security status is the alert mode, or in other words, represents the alert status. If it is determined in step b18 that the security status is the alert mode, the procedure proceeds to step b19, in which the drive recorder CPU 22 determines whether the information representing the previous security status stored in the security status storage area of the second RAM 25 is the preliminary alarm mode. If it is determined in step b19 that the security status is the preliminary alarm mode, this indicates that the mode has shifted to the alert mode without shifting to the alarm mode during the period of the preliminary alarm mode. The procedure then proceeds to step b20, in which the drive recorder CPU 22 effects start of the time measurement by the timer TM2 for measuring the time elapsed from the end of the preliminary alarm mode, and the procedure then proceeds to step b21. If a negative determination is made in step b18 or b19, the procedure proceeds to step b21.

In step b21, the drive recorder CPU 22 determines whether the information representing the current security status is the alarm mode, and whether the mode has shifted from another mode to the alarm mode for the first time. If it is determined in step b21 that the security status is the alarm mode, then it is determined that the abnormal condition is an actual theft, and the procedure proceeds to step b22 in order to set the configuration information for recording image and sound information related to the theft. In step b22, the drive recorder CPU 22 determines whether the information representing the previous security status stored in the security status storage area of the second RAM 25 is the preliminary alarm mode. If it is determined in step b22 that the security status is the preliminary alarm mode, this indicates that the mode has shifted to the alarm mode from the alert mode after shifting to the preliminary alarm mode. Accordingly, the procedure proceeds to step b23, in which the drive recorder CPU 22 sets "image and sound information recording permission flag F2 into the nonvolatile ROM 21" to "1". The procedure then proceeds to step b24, in which the drive recorder CPU 22 sets the storage time period T4 of the image and sound information into the second RAM 25, which is stored in the time storage area of the internal memory, to a second time period Tb1 that is longer than the first time period Ta, and the procedure proceeds to step b28. In this embodiment, the second time period Tb1 is 40 seconds.

If it is determined in step b22 that the security status is the preliminary alarm mode, this indicates that the mode has shifted from the alert mode to the alarm mode without shifting to the preliminary alarm mode. Accordingly, the procedure proceeds to step b25, in which the drive recorder CPU 22 sets the storage permission flag F1 to "1", and the procedure proceeds to step b26, in which the drive recorder CPU 22 sets the recording permission flag F2 to "1". The procedure then proceeds to step b27, in which the drive recorder CPU 22 sets the storage time period T4 to a fourth time period Tb2 that is longer than the first time period Ta and shorter than the second time period Tb1, and the procedure proceeds to step b28. In this embodiment, the fourth time period Tb2 is 30 seconds. The above-described second time period Tb1 and fourth time period Tb2 may be selected to be equal. If a negative determination is made in step b21, the procedure proceeds to step b28.

In step b28, the drive recorder CPU 22 determines whether the storage permission flag F1 is "1". If it is determined in step b28 that the flag is "1", then it can be determined that the vehicle is in either the state in which the abnormal condition may lead to a theft, or the state in which a theft has occurred, and therefore, the procedure proceeds to step b29 in order to perform the process of storing the image and sound information from the drive recorder cameras 11 and 11A and the drive recorder microphone 12 into the second RAM 25. In step b29, the drive recorder CPU 22 effects start of supplying power to the drive recorder cameras 11 and 11A and the drive recorder microphone 12, and effects start of image shooting and sound input. The procedure then proceeds to step b30.

In step b30, the drive recorder CPU 22 determines whether the recording permission flag F2 is "1". If it is determined in step b30 that the flag is not "1", then it can be determined that the current mode is the preliminary alarm mode in which the abnormal condition may lead to a theft. Accordingly, the procedure proceeds to step b31, in which the drive recorder CPU 22 determines whether a first storage timing into the second RAM 25 has arrived. Each time the first storage timing into the second RAM 25 has arrived, the procedure proceeds to step b33, in which the drive recorder CPU 22 causes the second RAM 25 to store thereinto the image information and the sound information, in association with the number information representing the event number, and the procedure proceeds to step b34. More specifically, in step b31, the drive recorder CPU 22 determines whether a first storage cycle time period has elapsed, and the first storage cycle time period is 500 ms, for example.

If it is determined in step b30 that the flag F2 is "1", then it can be determined that a theft has occurred, and the procedure proceeds to step b32, in which the drive recorder CPU 22 determines whether a second storage timing into the second RAM 25 has arrived. Each time the second storage timing into the second RAM 25 has arrived, the procedure proceeds to step b34. More specifically, in step b32, the drive recorder CPU 22 determines whether a second storage cycle time period has elapsed. The second storage cycle time period is shorter than the first storage cycle time, and may be 100 ms, for example. If it is determined in step b28 that the flag F2 is not "1", the procedure proceeds to step b37. If a negative determination is made in step b31 or b32, the procedure proceeds to step b34.

As shown in steps b31 and b32, the storage cycle of the image and sound information into the second RAM 25 is set to be longer when it is determined that the abnormal condition may lead to a theft, than when it is determined that a theft has occurred. The purpose of this is to reduce power consumption in view of the following situations. For example, in a case where a large vehicle such as a truck passes near a parked vehicle, a case where there is a heavy rain, or a case where some object hits the vehicle without any theft taking place, large vibrations are generated and the preliminary alarm status may be established, i.e., it may be determined that the abnormal condition may lead to a theft. If the image and sound information are recorded in such situations with the same cycle as that in a case where it is determined that a theft has occurred, power is consumed unnecessarily. By decreasing the number of times per unit time of storage into the second RAM 25 by setting the storage cycle of the image and sound information into the second RAM 25 longer, it is possible to store, into the second RAM 25, the image and sound information acquired in the state in which the abnormal condition may lead to a theft, while saving power consumption. According to another embodiment of the invention, the first storage cycle time period and the second storage cycle time period may be set to be equal, and the processes of steps b30 and b32 can be omitted in such a case.

The method for storing the sound information into the second RAM 25 will now be described. The drive recorder main body 10 includes a buffer (not shown). When storing the image and sound information of the front and the interior of the vehicle that have been obtained by the drive recorder cameras 11 and 11A and the drive recorder microphone 12 into the second RAM 25, the drive recorder CPU 22 causes the buffer to successively store the sound information thereinto. With the timing with which the image information is stored into the second RAM 25, the drive recorder CPU 22 causes the second RAM 25 to store thereinto the sound information that has been stored into the buffer from the time point at which the image information was stored previously to the time point at which the image information is stored currently, in association with the image information. In the case of storing the image information, for example, at time points t1 to tn (n is a natural number of 2 or more), the sound information that has been stored into the buffer from a time point tk−1 to a time point tk (k is an integer of 2 or more) is stored into the second RAM 25, in association with the information representing the event number and the image information stored in the time point tk.

In step b34, the drive recorder CPU 22 determines whether the measured time TM1 by the timer TM1 is equal to or longer than the storage time period of the image and sound information into the second RAM 25. If it is determined that the measured time TM1 is equal to or longer than the storage time period T4, the procedure proceeds to step b35 in order to end storage of the image and sound information into the second RAM 25, and the drive recorder CPU 22 sets "image and sound information storage permission flag F1 into the second RAM 25" to "0". The procedure then proceeds to step b36, in which the drive recorder CPU 22 stops supplying power to the drive recorder cameras 11 and 11A and the drive recorder microphone 12, and stops image shooting and sound input, and the procedure proceeds to step b37. If a negative determination is made in step b34, the procedure proceeds to step b37.

In step b37, the drive recorder CPU 22 determines whether "image and sound information recording permission flag F2 into the nonvolatile ROM 21" is "1". If it is determined in step b37 that the flag F2 is "1", it can be determined that a theft has occurred, and the procedure proceeds to step b38 in order to record the image and sound information into the nonvolatile ROM 21, and the drive recorder CPU 22 causes the nonvolatile ROM 21 to record thereinto the number information representing the latest event number stored in the second RAM 25, as well as the image information and sound information stored in association with the number information corresponding to the event number representing this latest event number, and effects transmission of the associated information to the data communication apparatus 4 by the drive recorder communication circuit 29, and the procedure proceeds to step b39.

In step b39, the drive recorder CPU 22 determines whether recording into the nonvolatile ROM 21 is completed. If it is determined in step b39 that the recording is completed, the procedure proceeds to step b40, in which the drive recorder CPU 22 sets the recording permission flag F2 to "0", and the operation is ended, after which the procedure proceeds to step b1 again. If a negative determination is made in step b37 or b39, the procedure proceeds to step b1.

The processes from steps b3 to b6 are referred to as "normal recording process", the processes of steps b7 and b8 are referred to as "transfer process", the processes from steps b12 to b17 are referred to as "recorder side preliminary alarm mode process", the processes from steps b18 to b20 are referred to as "recorder side alert mode process", the process from steps b21 to b27 are referred to as "recorder side alarm mode process", the processes from steps b28 to b36 are referred to as "RAM storage process", and the processes from steps b37 to b40 are referred to as "ROM recording process".

FIGS. 12A to 12D are timing charts schematically illustrating how the image information and the sound information are stored into the second RAM 25, or recorded into the nonvolatile ROM 21 by the operation described above. As shown in FIGS. 12A to 12D, the level of the signal outputted from the sensors is high when an abnormal condition has been detected, i.e., when glass breakage has been detected by the glass breakage sensor 58, when a moving body has been detected by the intrusion sensor 59, or when vibrations have been detected by the vibration sensor 64. The level of the signal outputted from the sensors is low when no abnormal condition has been detected, i.e., when no glass breakage has been detected by the glass breakage sensor 58, when no moving body has been detected by the intrusion sensor 59, and when no vibration has been detected by the vibration sensor 64.

FIG. 12A illustrates an operation performed when the mode has been shifted from the alert mode to the preliminary alarm mode, and shifts to the alert mode again. As shown in FIG. 12A, when an abnormal condition has been detected at a timing t1 based on a signal from any of the sensors, the drive recorder CPU 22 operates in the preliminary alarm mode as described above, and causes the second RAM 25 to store thereinto the image and sound information for the storage time period T4 (=Ta). When the time elapsed from the previous detection (t1) of an abnormal condition until the next detection of an abnormal condition at a timing t2 is longer than the storage time period T4 (=Ta) of the image and sound information into the second RAM 25, the drive recorder CPU 22 causes the second RAM 25 to store thereinto the image information and sound information, but does not cause the nonvolatile ROM 21 to record thereinto the image information and sound information stored in the second RAM 25. When the mode has shifted from the alert mode to the preliminary alarm mode and then shifts to the alert mode again without detecting an abnormal condition again during the preliminary alarm mode in this way, the drive recorder CPU 22 causes the second RAM 25 to store thereinto the image and sound information, but does not cause the nonvolatile ROM 21 to record thereinto the image and sound information because it can be determined that no theft has occurred.

FIG. 12B illustrates an operation performed when the mode has shifted from the alert mode to the preliminary alarm mode, and further shifts to the alarm mode. As shown in FIG. 12B, when an abnormal condition has been detected at the timing t1 based on a signal from any of the sensors, the drive recorder CPU 22 operates in the preliminary alarm mode as described above, and causes the second RAM 25 to store thereinto image and sound information for the storage time period T4 (=Ta). However, when an abnormal condition has been detected again at the timing t2 based on a signal from any of the sensors during the storage time period T4, the drive recorder CPU 22 operates in the alarm mode, extends the storage time period T4 from Ta to Tb, cause the second RAM 25 to store thereinto image information and sound information for the storage time period T4 (=Tb1), and causes the nonvolatile ROM 21 to record thereinto the image information and sound information stored in the second RAM 25 for the storage time period T4 (=Tb1). When the mode has shifted from the alert mode to the preliminary alarm mode and then shifts to the alarm mode in this way, it can be determined that a theft has occurred, so that the drive recorder CPU 22 causes the second RAM 25 to store thereinto the image and sound information acquired during the periods of the preliminary alarm mode and the alarm mode, and also causes the nonvolatile ROM 21 to record thereinto that image and sound information.

Figure 12C:
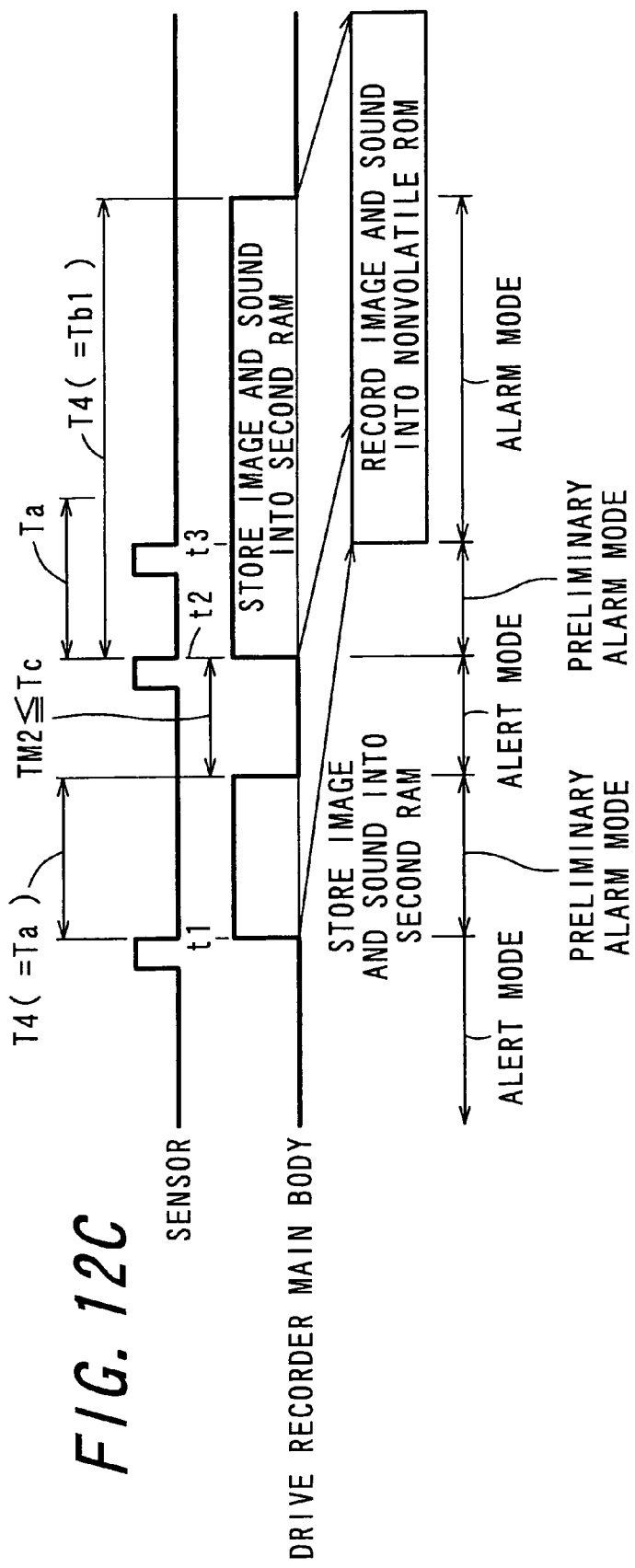

FIG. 12C illustrates an operation performed when the mode has shifted from the alert mode to the preliminary alarm mode, has shifted to the alert mode again, then has shifted to the preliminary alarm mode again within a third time period Tc, and further shifts to the alarm mode. As shown in FIG. 12C, when an abnormal condition has been detected at the timing t1 based on a signal from any of the sensors, the drive recorder CPU 22 operates in the preliminary alarm mode as described above, and causes the second RAM 25 to store thereinto image and sound information for the storage time period T4 (=Ta). However, when an abnormal condition has not been detected again during the storage time period T4, the drive recorder CPU 22 ends the storage, and the mode is shifted to the alert mode. When an abnormal condition has been detected again at the timing t2 based on a signal from any of the sensors, if the elapsed time TM2 from the end of the preliminary alarm mode is within the third time period Tc, the drive recorder CPU 22 associates the image and sound information stored into the second RAM 25 in response to the previous (t1) detection with the image and sound information stored into the second RAM 25 in response to the current (t2) detection. Then, the drive recorder CPU 22 operates in the preliminary alarm mode from the above-mentioned re-detection (t2) of an abnormal condition based on a signal from any of the sensors. When an abnormal condition has been detected again at a timing t3 based on a signal from any of the sensors during storage of the image and sound information into the second RAM 25 for the storage time period T4 (=Ta), the drive recorder CPU 22 operates in the alarm mode, extends the storage time period T4 from Ta to Tb1, causes the second RAM 25 to store thereinto the image information and sound information for this extended storage time period T4 (=Tb1), and causes the nonvolatile ROM 21 to record thereinto the image and sound information stored into the second RAM 25 in response to the detection (t1) before the previous detection of an abnormal condition and the image information and sound information stored into the second RAM 25 for the storage time period T4 (=Tb1).

When the mode has shifted from the alert mode to the preliminary alarm mode, has shifted to the alert mode again, then has shifted to the preliminary alarm mode again within the third time period Tc, and further shifts to the alarm mode in this way, there is the possibility that the previous and current preliminary alarm modes may be caused by a single theft. Accordingly, the drive recorder CPU 22 causes the second RAM 25 to store thereinto the image and sound information acquired during the periods of the previous and current preliminary alarm modes, and the alarm mode, and also causes the nonvolatile ROM 21 to record thereinto that image and sound information.

Figure 12D:
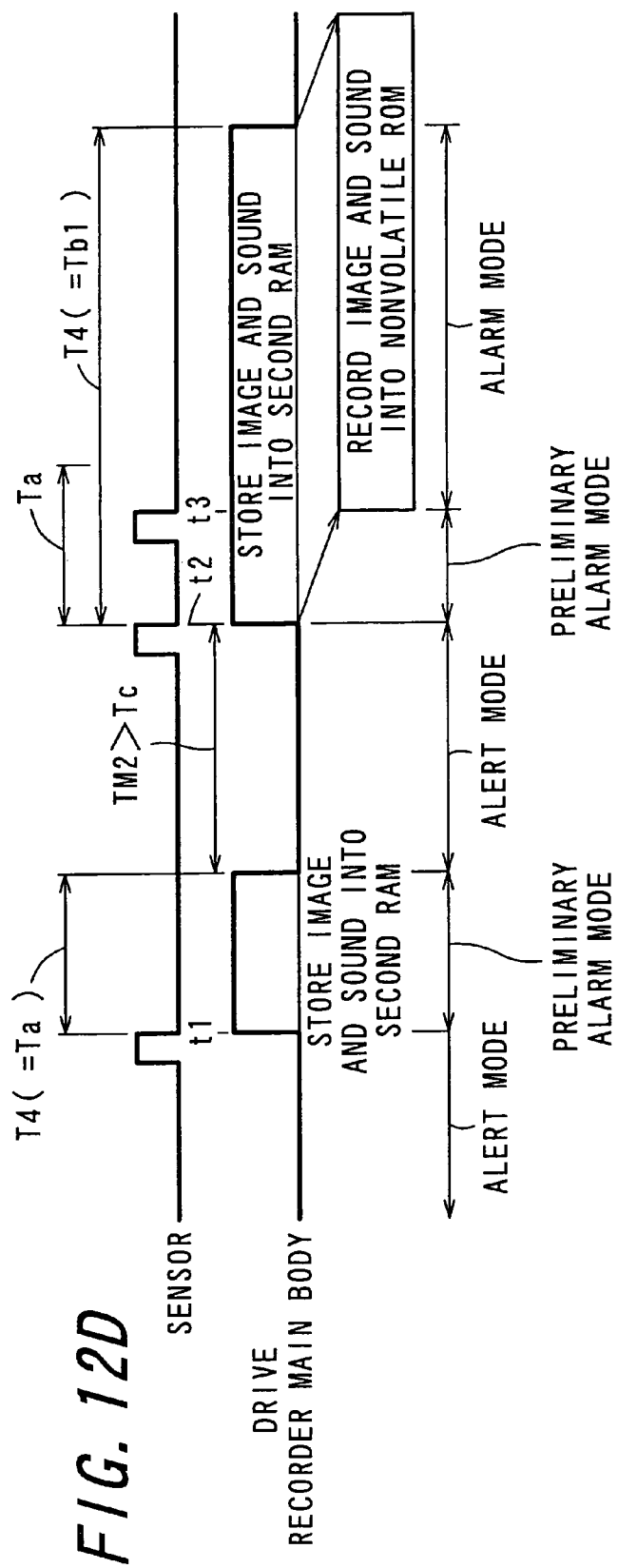

FIG. 12D illustrates an operation performed when the mode has shifted from the alert mode to the preliminary alarm mode, has shifted to the alert mode again, then has shifted to the preliminary alarm mode again after the third time period Tc has elapsed, and further shifts to the alarm mode. As shown in FIG. 12D, when the mode has shifted from the alert mode to the preliminary alarm mode, has shifted to the alert mode again, then has shifted to the preliminary alarm mode again within the third time period Tc, and further shifts to the alarm mode, the image and sound information stored into the second RAM 25 during the previous preliminary alarm mode are also recorded into the nonvolatile ROM 21. However, when the mode has shifted from the alert mode to the preliminary alarm mode at the timing t1, has shifted to the alert mode again, then has shifted to the preliminary alarm mode again at the timing t2 after the third time period Tc has elapsed, and then further shifts to the alarm mode, it can be considered that the image and sound information stored into the second RAM 25 during the previous preliminary alarm mode are not related to the current alarm mode, and therefore are not recorded into the nonvolatile ROM 21.

As has been described above, with the information recording apparatus 1, it is possible to save power consumption since the information is acquired by the drive recorder camera 11 and the acquired information is stored into the second RAM 25 only when occurrence of an abnormal condition of the vehicle has been detected, i.e., when there is a possibility of a theft. Accordingly, even in a situation where the vehicle is parked for a long period of time and the vehicle battery 39 mounted in the vehicle is not charged, it is possible to prevent exhaustion of the battery.

Furthermore, with the information recording apparatus 1, the image and sound information stored in the second RAM 25 are recorded into the nonvolatile ROM 21 when occurrence of an abnormal condition of the vehicle has been detected by the sensors and occurrence of an abnormal condition of the vehicle has been detected again by the sensors before the first time period Ta has elapsed from the previous detection. Accordingly, it is possible to prevent, for example, a situation where the image and sound information are recorded into the nonvolatile ROM 21 when an abnormal condition of the vehicle that is not related to an abnormal condition of the vehicle that should be detected, such as a theft. Consequently, it is possible to prevent unnecessary recovering of the image and sound information into the nonvolatile ROM 21, thereby effectively utilizing the limited recording capacity of the nonvolatile ROM 21. Since unnecessary recording of the image and sound information into the nonvolatile ROM 21 can be inhibited, even if the vehicle is parked for a long period of time, it is possible to prevent such a problem that there is no available space left in the nonvolatile ROM 21 when an actual theft occurs, so that the image and sound information relating to a theft and the preparation of that theft can be recorded with an improved reliability when a theft occurs. Furthermore, since the image and sound information are also recorded for a theft preparation before a theft is carried out, the recorded image and sound information can facilitate identification of the criminal, and also can contribute to knowing the method employed in the criminal act.

FIGS. 13 and 14 are flowcharts illustrating an operation performed when the anti-theft CPU 52 in the anti-theft device of an information recording apparatus according to a second embodiment of the invention executes the control program stored in the anti-theft ROM 51. The information recording apparatus of this embodiment and the information recording apparatus 1 described above are different only in the operation performed in the anti-theft device and the configuration of the intrusion sensor 59, and the rest of the configuration and the operation performed in the drive recorder 2 are the same. Therefore, the same parts are denoted by the same reference numerals with the description thereof omitted, and only the different parts will be described. This embodiment is different from the information recording apparatus 1 of the embodiment described above in that the intrusion sensor 59 is implemented by a dual-zone sensor. The detection area of the intrusion sensor 59 includes the interior of the compartment 63 of a vehicle (vehicle interior), which is an area encircled by the imaginary line shown in FIG. 6, and the exterior of the vehicle compartment (vehicle exterior), which is a second area encircled by the broken line and surrounding the window glass. The intrusion sensor 59 outputs different signals in a case where a moving body is present in the vehicle interior and a case where a moving body is present in the vehicle exterior. The anti-theft CPU 52 detects the presence of a moving body in the vehicle interior and the presence of a moving body in the vehicle exterior based on a signal outputted from the intrusion sensor 59.

When power is supplied to the anti-theft CPU 52, the procedure proceeds to step c1, and the process is commenced. In step c1, the anti-theft CPU 52 performs the alert mode setting process described above, and the procedure proceeds to step c2, in which the anti-theft CPU 52 performs the non-alert mode setting process described above, and the procedure proceeds to step c3.

In step c3, the anti-theft CPU 52 determines whether the security status is the alert mode or the preliminary alarm mode, i.e., determines whether the security status stored in the anti-theft RAM 56 is the alert status or the preliminary alarm status. If it is determined in step c3 that the security status is the alert mode or the preliminary alarm mode, it is determined that the mode has shifted to the mode in which theft monitoring is performed, and the procedure proceeds to step c4, in which the anti-theft CPU 52 determines whether any of the vehicle doors has been opened based on a detection signal from the door sensor 60. If it is determined in step c4 that the vehicle door has been opened, then it is determined that an illegal intrusion into the vehicle has occurred, and the procedure proceeds to step c6, in which the anti-theft CPU 52 sets the alarm mode, and the procedure proceeds to step c13. If a negative determination is made in step c4, the procedure proceeds to step c5.

In step c5, the anti-theft CPU 52 determines whether an abnormal condition has been detected in the vehicle interior based on a detection signal from the intrusion sensor 59. If it is determined in step c5 that an abnormal condition has been detected, then it is determined that an illegal intruder has intruded into the vehicle compartment from the vehicle window, instead of intruding into the vehicle compartment after opening the vehicle door, and the procedure proceeds to step c6, in which the anti-theft CPU 52 sets the alarm mode, and the procedure proceeds to step c13. If a negative determination is made in step c5, it is determined that no illegal intrusion into the vehicle has occurred, and the procedure proceeds to step c7.

In step c7, the anti-theft CPU 52 determines whether an abnormal condition has been detected in the vehicle exterior based on a detection signal from the intrusion sensor 59. If it is determined in step c7 that an abnormal condition has been detected, this indicates that no illegal intrusion into the vehicle has occurred and the abnormal condition has not led to a theft, but there is the possibility that a person is making some kind of movement in close proximity to the vehicle. Accordingly, it is determined that the abnormal condition may lead to a theft, and the procedure proceeds to step c8, in which the anti-theft CPU 52 sets the preliminary alarm mode, and the procedure proceeds to step c9.

The processes from steps c9 to c12 respectively correspond to the processes from steps a10 to a12 described above in the flowchart shown in FIG. 7, and therefore the description thereof will be omitted. However, the intrusion sensor is not included in the sensors used for determination in step c9. If a negative determination is made in step c3 or c9, or when the process of step c11 or c12 ends, the procedure proceeds to step c13. In step c13, the anti-theft CPU 52 performs the preliminary alarm mode process described above, and the procedure proceeds to step c14, in which the anti-theft CPU 52 performs the alarm mode process described above, and the procedure proceeds to step c15. In step c15, the anti-theft CPU 52 notifies the drive recorder of the current security status (mode), and the procedure proceeds to step c1.

As has been described above, the information recording apparatus of this embodiment can detect the presence of a moving body in the vehicle exterior by using a dual-zone sensor as the intrusion sensor 59 in addition to exhibiting the effect achieved by the information recording apparatus 1 described above. Accordingly, it is possible to clearly distinguish between an act performed by a burglar in the exterior of the vehicle compartment (theft preparation) and an act performed by a burglar in an attempt to illegally intrude into the vehicle compartment (theft), and therefore the information relating to a theft preparation can also be recorded into the nonvolatile ROM 21 reliably when a theft occurs.

FIG. 15 is a flowchart illustrating an operation performed when the anti-theft CPU 52 in the anti-theft device of an information recording apparatus according to a third embodiment of the invention executes the control program stored in the anti-theft ROM 51. Essentially, the information recording apparatus of this embodiment and the information recording apparatus 1 described above are different only in the operation performed in the anti-theft device 3 and the operation performed in the drive recorder 2, and the rest of the configuration and are the same. Therefore, the same parts are denoted by the same reference numerals with the description thereof omitted, and only the different parts will be described. This embodiment is different from the information recording apparatus 1 described above in that the vibration sensor 64 is not provided in the vehicle, and the detection of vibrations is performed using the G sensor 30 included in the drive recorder instead of the vibration sensor 64.

When power is supplied to the anti-theft CPU 52, the procedure proceeds to step d1, and the process is commenced. In step d1, the anti-theft CPU 52 performs the alert mode setting process described above, and the procedure proceeds to step d2, in which the anti-theft CPU 52 performs the non-alert mode setting process described above, and the procedure proceeds to step d3.

In step d3, the anti-theft CPU 52 determines whether the security status is the alert mode or the preliminary alarm mode, i.e., determines whether the security status stored in the anti-theft RAM 56 is the alert status or the preliminary alarm status. If it is determined in step d3 that the security status is the alert mode or the preliminary alarm mode, then it is determined that the mode has shifted to the mode in which theft monitoring is performed, and the procedure proceeds to step d4, in which the anti-theft CPU 52 determines whether any of the vehicle doors has been opened based on a detection signal from the door sensor 60. If it is determined in step d4 that any of the vehicle door has been opened, then it is determined that an illegal intrusion into the vehicle has occurred, and the procedure proceeds to step d9, in which the anti-theft CPU 52 sets the alarm mode, and the procedure proceeds to step d10. If a negative determination is made in step d4, the procedure proceeds to step d5.

In step d5, the anti-theft CPU 52 determines whether an abnormal condition has been detected by any of the glass breakage sensor 58 and the intrusion sensor 59 based on detection signals from the glass breakage sensor 58 and the intrusion sensor 59. If it is determined in step d5 that no abnormal condition has been detected, the procedure proceeds to step d6, in which the anti-theft CPU 52 determines whether there is a detection notification from the G sensor 30. That is, the anti-theft CPU 52 determines whether the anti-theft communication circuit 54 has been notified by the drive recorder 2 of the fact that the G sensor 30 has detected vibrations. If a positive determination is made in step d5, and if it is determined in step d6 that there is a detection notification, then it is determined that the detected abnormal condition may lead to a theft, or is caused by a theft, and the procedure proceeds to step d7, in which the anti-theft CPU 52 determines whether the security status is the preliminary alarm mode. If it is determined in step d7 that the security status is not the preliminary alarm mode, then it is determined that the abnormal condition has not led to a theft, but may lead to a theft, and the procedure proceeds to step d8, in which the anti-theft CPU 52 sets the preliminary alarm mode, and the procedure then proceeds to step d10.

If it is determined in step d7 that the security status is the preliminary alarm mode, the procedure proceeds to step d9, in which the anti-theft CPU 52 sets the alarm mode, and the procedure proceeds to step d10. In step d10, the anti-theft CPU 52 performs the anti-theft device side preliminary alarm mode process described above, and the procedure proceeds to step d11. In step d11, the anti-theft CPU 52 performs the anti-theft device side alarm mode process described above, and the procedure proceeds to step d12. In step d12, the anti-theft CPU 52 notifies the drive recorder of the current security status (mode), and the procedure proceeds to step d1.

Figure 16:
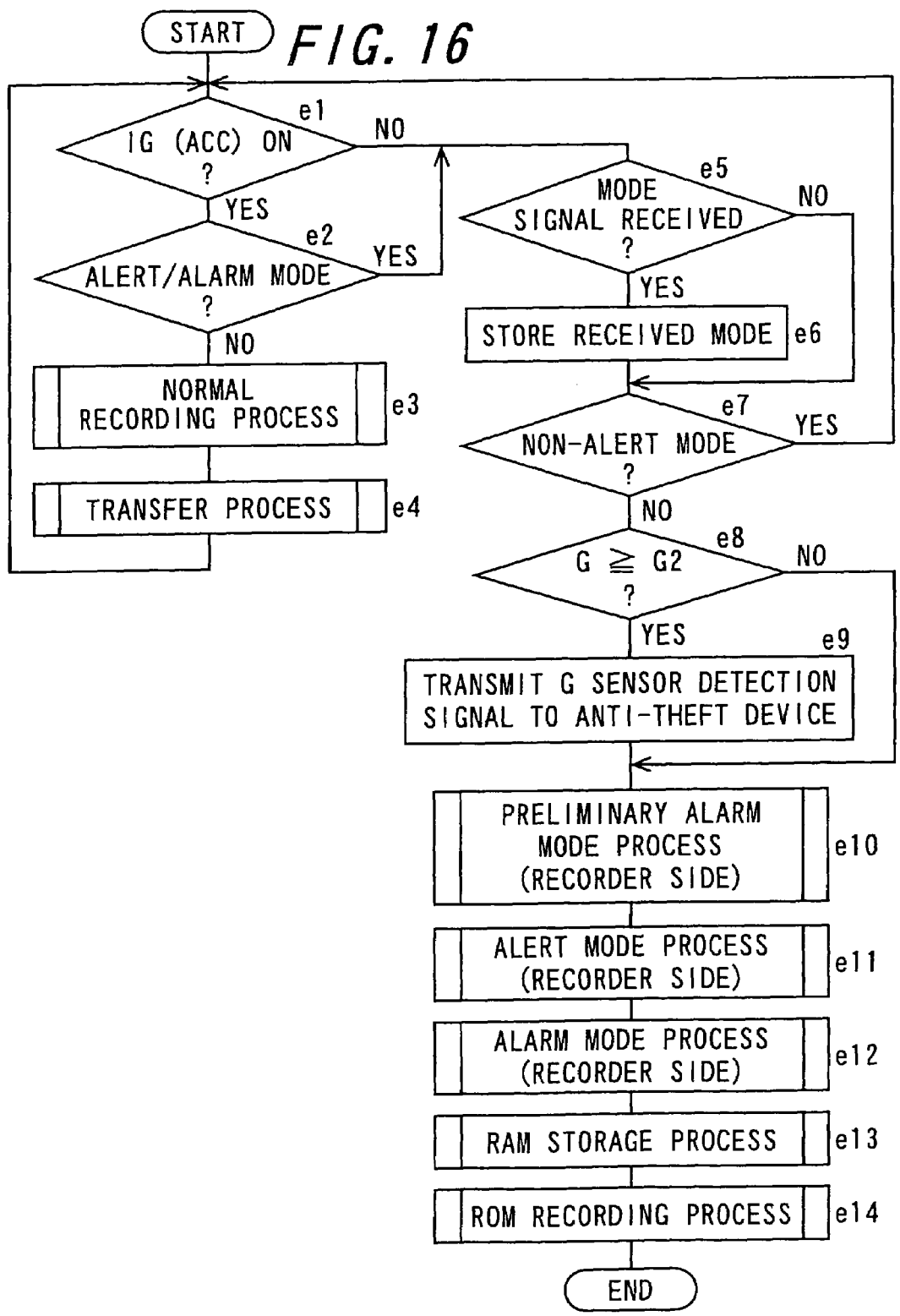
FIG. 16 is a flowchart illustrating an operation performed when the drive recorder CPU in the drive recorder of the information recording apparatus according to the third embodiment of the invention executes the control program stored in the nonvolatile ROM.

FIG. 16 is a flowchart illustrating an operation performed when the drive recorder CPU 22 in the drive recorder of the information recording apparatus according to the third embodiment of the invention executes the control program stored in the nonvolatile ROM 21. When power is supplied to the drive recorder CPU 22, the procedure proceeds to step e1, and the process is commenced. Steps e1 and e2 respectively correspond to steps b1 and b2 described above in the flowchart shown FIG. 9, and therefore the description thereof will be omitted. If a negative determination is made in step e2, the procedure proceeds to step e3. In step e3, the drive recorder CPU 22 performs the normal recording process described above, and the procedure proceeds to step e4. In step e4, the drive recorder CPU 22 performs the transfer process described above, and the procedure proceeds to step e1. If a negative determination is made in step e1, or if a positive determination is made in step e2, the procedure proceeds to step e5 in order to perform the theft monitoring process during non-driving conditions.

Steps e5 to e7 respectively correspond to steps b9 to b11 in the flowchart shown in FIG. 9, and therefore, the description thereof will be omitted. If a positive determination is made in step e7, the procedure proceeds to step e1. If a negative determination is made in step e7, the drive recorder CPU 22 determines whether an acceleration G detected by the G sensor 30 is equal to or more than a predetermined value G2 based on a signal detected by the G sensor 30, in order to perform the theft monitoring process during non-driving conditions. Here, the predetermined value G2 is a value used for determining whether vibrations are generated as a result of a theft, and is selected to be a value less than the predetermined value G1, for example, 0.1 G. If it is determined in step e8 that the acceleration G is equal to or more than the predetermined value G2, then it is determined that the vibrations are generated as a result of a theft, and the procedure proceeds to step e9, in which the drive recorder CPU 22 effects transmission of a G sensor detection signal indicating that the G sensor 30 has detected vibrations to the anti-theft device 3, and the procedure proceeds to step e10. When this G sensor detection signal is supplied, the anti-theft CPU 52 determines that there is a detection notification from the G sensor 30. If a negative determination is made in step e8, the procedure proceeds to step e10.

In step e10, the drive recorder CPU 22 performs the recorder side preliminary alarm mode process described above, and the procedure proceeds to step e11, in which the drive recorder CPU 22 performs the recorder side alert mode process described above. The procedure then proceeds to step e12, in which the drive recorder CPU 22 performs the recorder side alarm mode process described above, and the procedure proceeds to step e13, in which the drive recorder CPU 22 performs the RAM storage process described above. The procedure then proceeds to step e13, in which the drive recorder CPU 22 performs the ROM recording process described above, and the operation is ended. The procedure then proceeds to step e1 again.

As has been described above, the information recording apparatus of this embodiment can achieve the same effect as that of the information recording apparatus 1 described above. Moreover, since vibrations are detected using the G sensor 30 of the drive recorder 2, the information recording apparatus of this embodiment can also be mounted in vehicles that do not include a vibration sensor 64. Furthermore, since it is not necessary to provide the vibration sensor 64 separately from the information recording apparatus 1, the apparatus can be made compact, thereby realizing a further reduction in the production cost.

Figure 17:
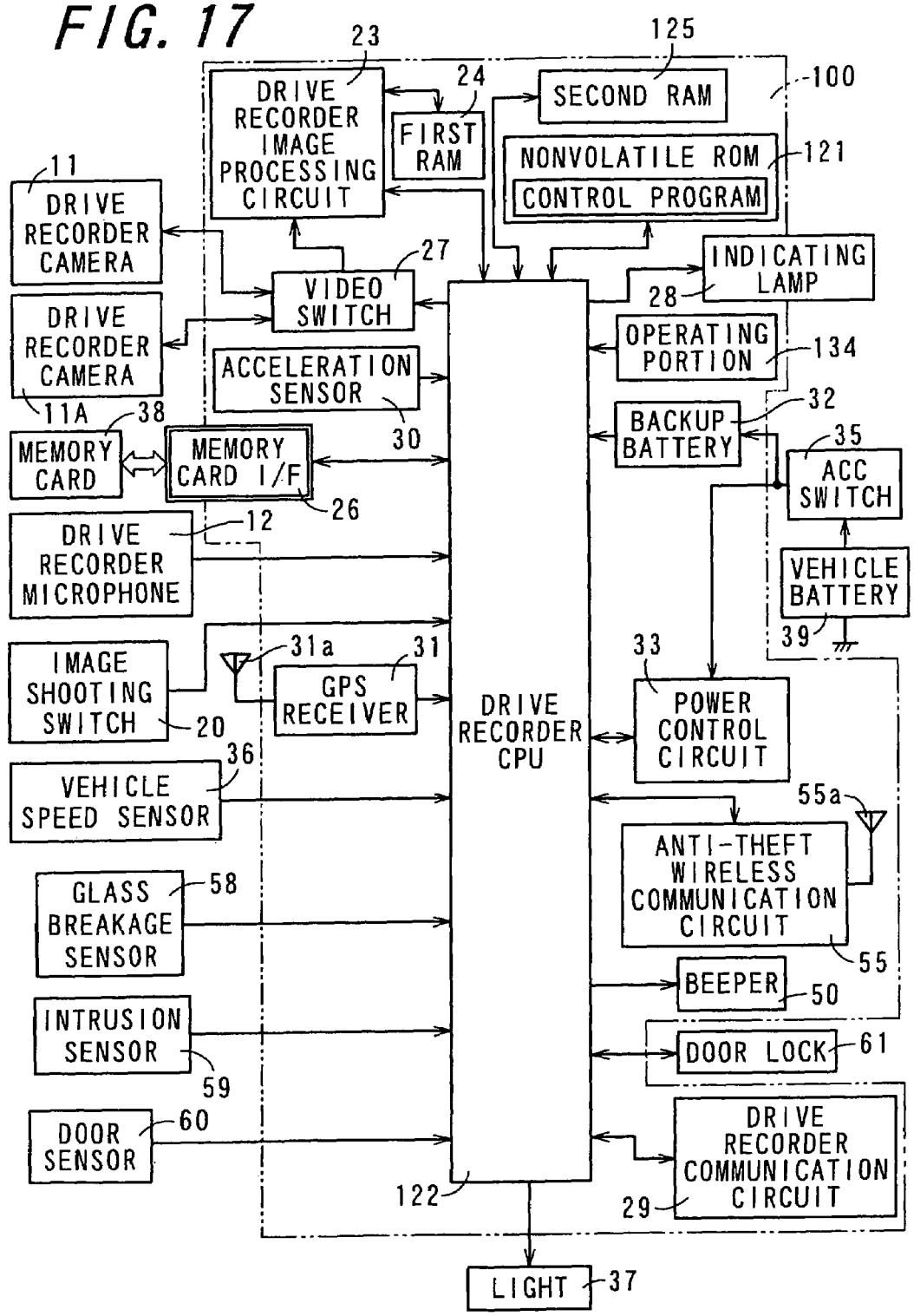
FIG. 17 is a block diagram showing the electrical configuration of an information recording apparatus according to a fourth embodiment of the invention.
Figure 18:
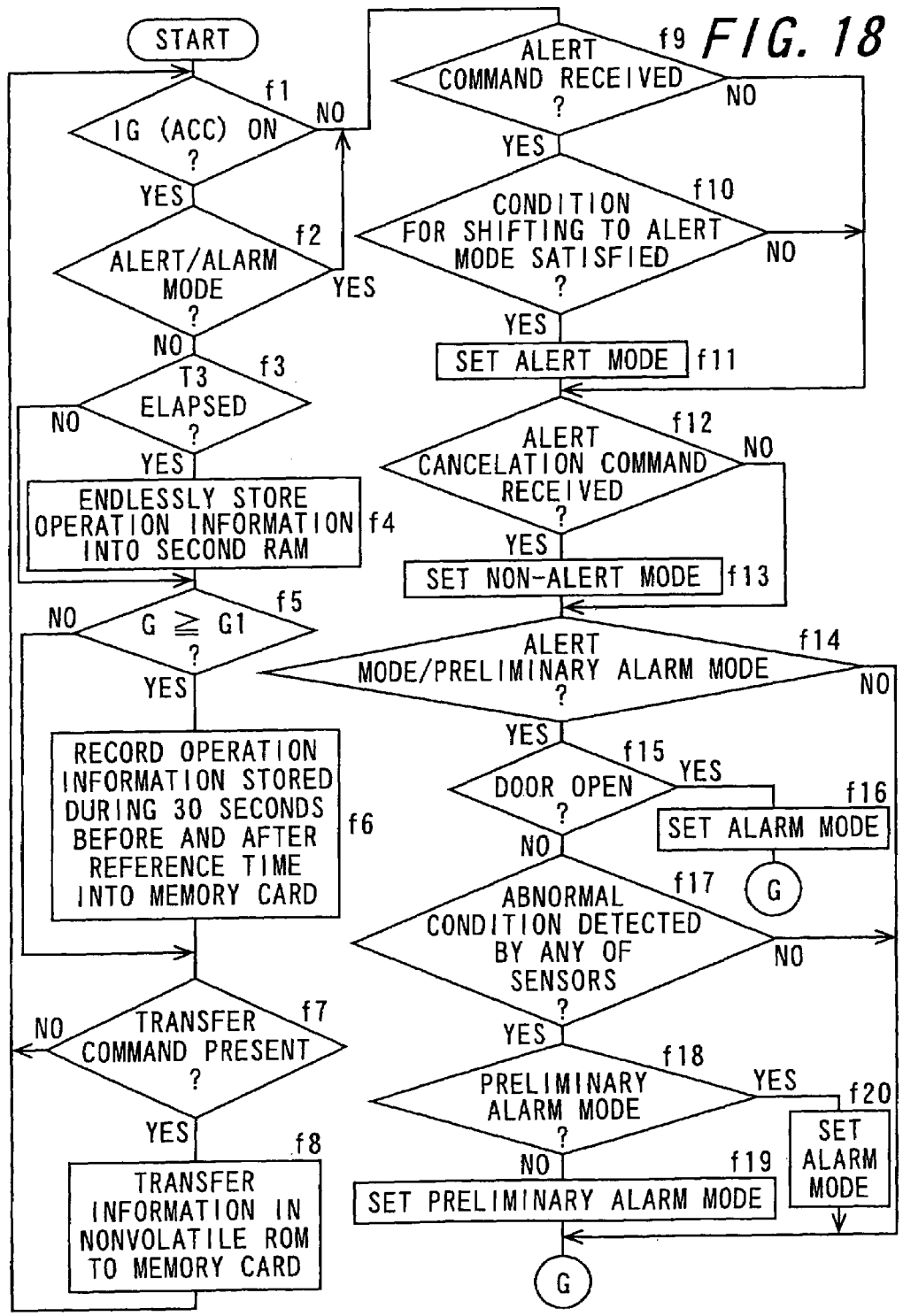
FIGS. 18 to 21 are flowcharts illustrating an operation performed when a drive recorder CPU executes the control program stored in a nonvolatile ROM.
Figure 19:
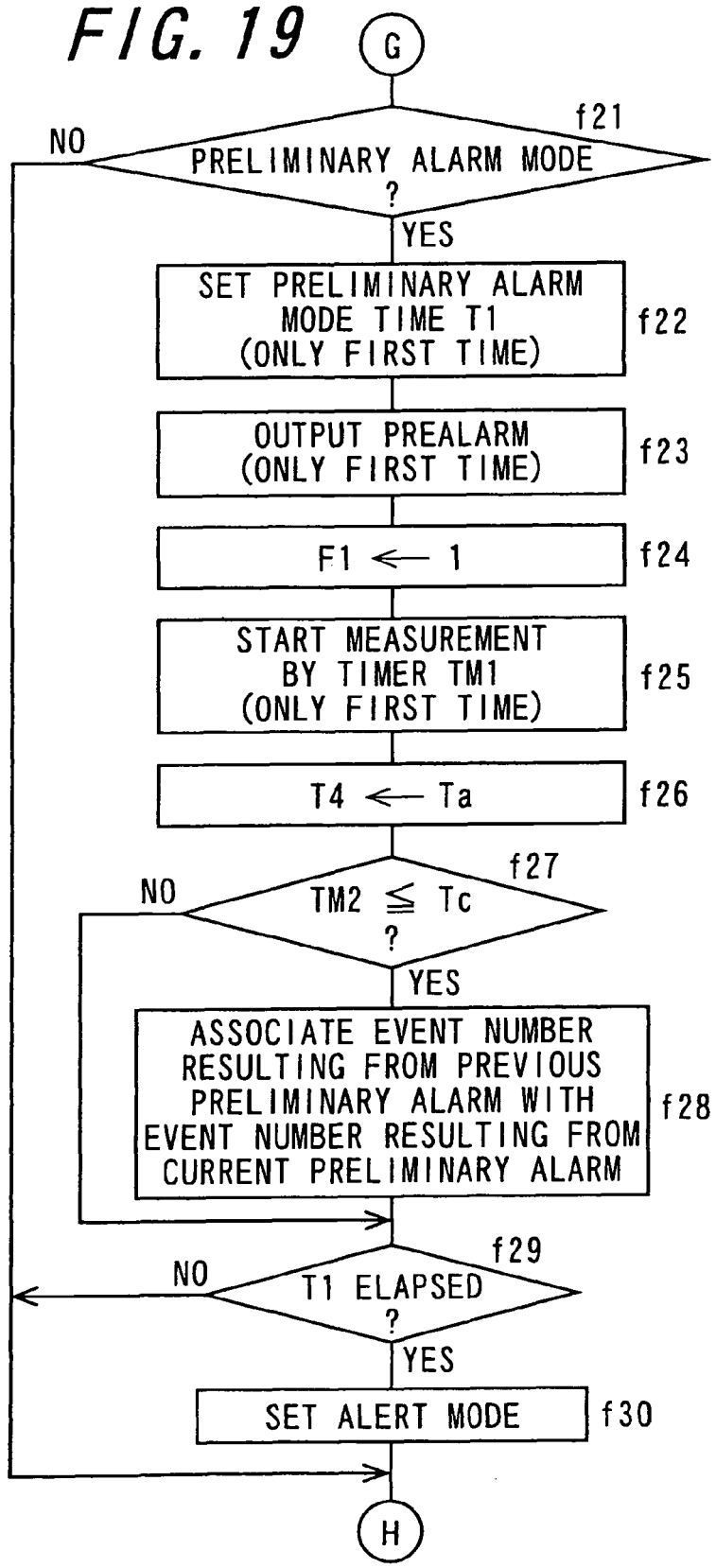
Figure 20:
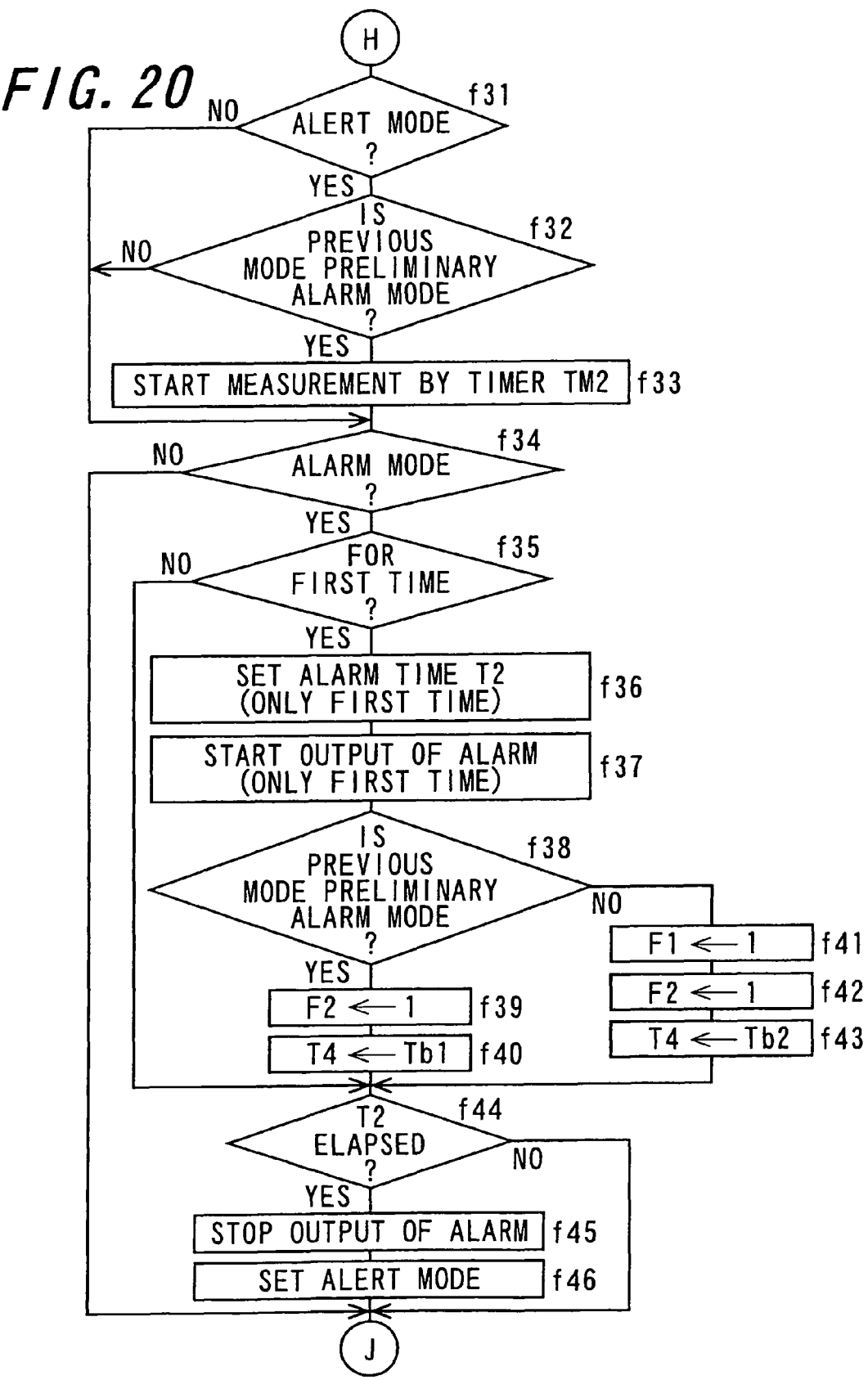
Figure 21:
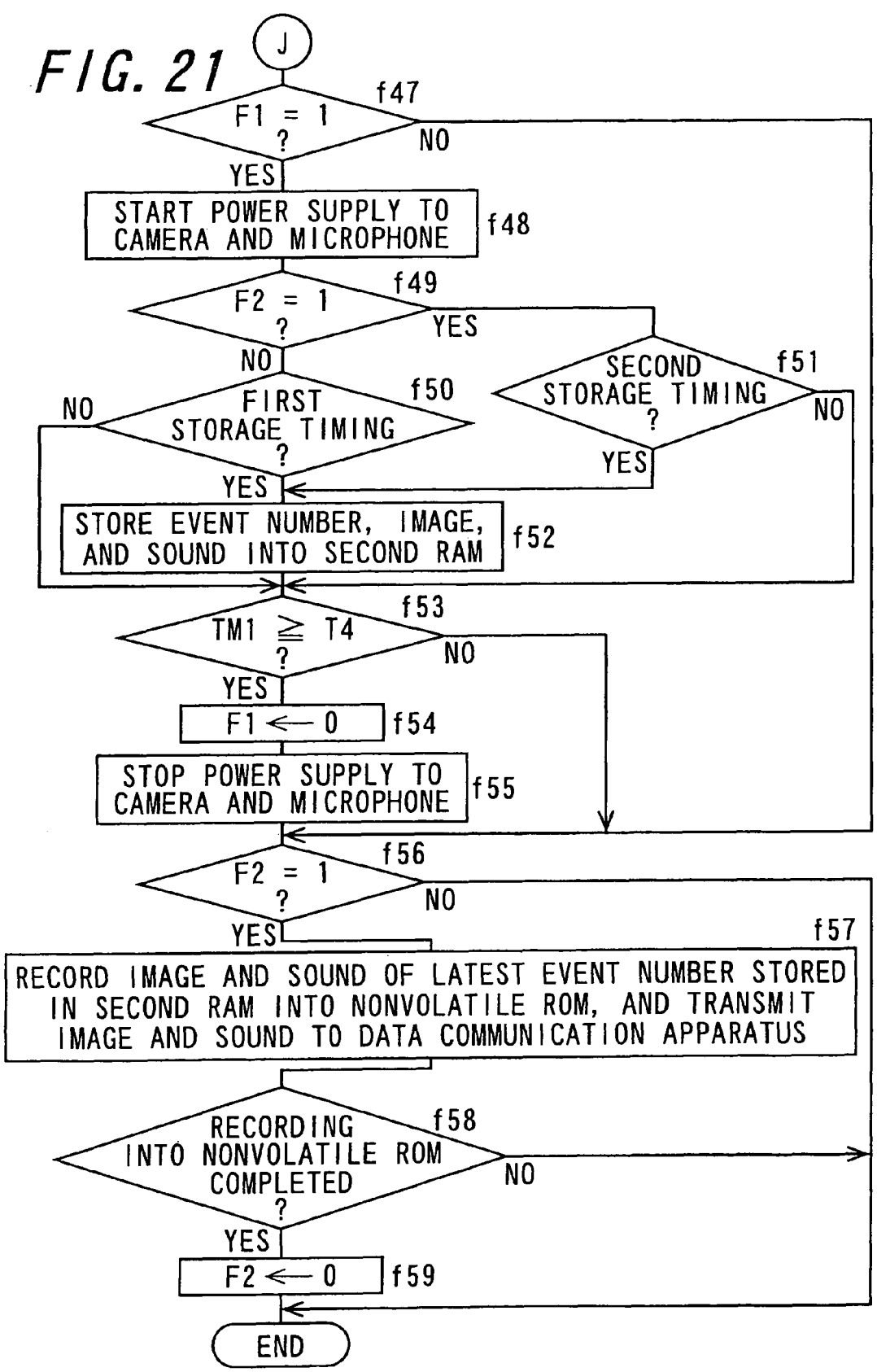

FIG. 17 is a block diagram showing the electrical configuration of an information recording apparatus 100 according to a fourth embodiment of the invention. In this embodiment, the drive recorder 2 and the anti-theft device 3 in the information recording apparatus 1 described above are integrated into one unit. The components that are the same as those of the information recording apparatus 1 described above are denoted by the same reference numerals, with the overlapping description omitted, and different parts will be described.

The information recording apparatus 100 includes a nonvolatile ROM 121, a drive recorder CPU 122, a drive recorder image processing circuit 23, a first RAM 24, a second RAM 125, memory card I/F 26, a video switch 27, an indicating lamp 28, a drive recorder communication circuit 29, a G sensor 30, a GPS receiver 31, a backup buttery 32, a power control circuit 33, a operating portion 134, a buzzer 50, a radio antenna 55a, and an anti-theft wireless communication circuit 55.

The drive recorder CPU 122 has the functions of both of the drive recorder CPU 22 and the anti-theft CPU 52 described above. Therefore, those parts that are electrically connected to the drive recorder CPU 22 or the anti-theft CPU 52 in the above-described embodiments are electrically connected to the drive recorder CPU 122 in this embodiment. The nonvolatile ROM 121 has the functions of both of the nonvolatile ROM 21 and the anti-theft ROM 51 described above, and the control program according to this embodiment is recorded in the nonvolatile ROM 21. The operating portion 134 has the functions of both of the operating portion 34 and the anti-theft operation key 57 described above. The second RAM 125 has functions of both of the second RAM 25 and the anti-theft RAM 56 described above.

FIGS. 18, 19, 20 and 21 are flowcharts illustrating an operation performed when the drive recorder CPU 122 executes the control program stored in the nonvolatile ROM 121. When power is supplied to the drive recorder CPU 122, the procedure proceeds to step f1, and the process is commenced.

Steps f1 to f8 respectively correspond to steps b1 to b8 described above in the flowchart shown in FIG. 9. The only difference is that the operation is performed by the drive recorder CPU 122, and therefore, the description thereof will be omitted. If the drive recorder CPU 122 makes a negative determination in step f1, or makes a positive determination in step f2, the procedure proceeds to step f9 in order to perform the theft monitoring process during non-driving conditions.

Steps f9 to f20 are the processes of deciding any of the non-alert mode, the alert mode, the preliminary alarm mode, and the alarm mode to be set, and respectively correspond to steps a1 to a11 described above in the flowchart shown in FIG. 7. The only difference is that the operation is performed by the drive recorder CPU 122, and therefore, the detailed description thereof will be omitted. When step f16, f19, or f20 ends, or if a negative determination is made in step f14 or f17, the procedure proceeds to step f21.

Steps f21 to f23 are the processes for informing the surrounding area with an alarm sound in order to prevent a theft when the abnormal condition may lead to a theft, and respectively correspond to steps a13 to a15 described above in the flowchart shown in FIG. 8. The only difference is that the operation is performed by the drive recorder CPU 122, and therefore, the detailed description thereof will be omitted. When step f23 ends, the procedure proceeds to step f24.

Steps f24 to f26 are the processes of making a setting for storing image and sound information into the second RAM 125 because an abnormal condition has occurred. Steps f27 and f28 are the processes for determining whether the previous and current preliminary alarm modes are caused by a single theft. Steps f24 to f28 respectively correspond to steps b13 to b17 described above in the flowchart shown in FIG. 9. The only difference is that the operation is performed by the drive recorder CPU 122, and therefore, the description thereof will be omitted. When step f28 ends, or if a negative determination is made in step f27, the procedure proceeds to step f29.

Steps f29 and f30 are the processes for shifting from the preliminary alarm mode to the alert mode, and respectively correspond to steps a16 and a17 described above in the flowchart shown in FIG. 8. The only difference is that the operation is performed by the drive recorder CPU 122, and therefore, the description thereof will be omitted. When step f30 ends, or if a negative determination is made in step f21 or f29, the procedure proceeds to step f31.

Steps f31 to f33 are the processes for starting measurement by the timer TM2 for determining whether the previous and current preliminary alarm modes are caused by a single theft, and respectively correspond to steps b18 to b20 described above in the flowchart shown in FIG. 9. The only difference is that the operation is performed by the drive recorder CPU 122, and therefore, the description thereof will be omitted. When step f33 ends, or if a negative determination is made in step f31 or f32, the procedure proceeds to step f34.

In step f34, the drive recorder CPU 122 determines whether the security status is the alarm mode. If it is determined in step f34 that the security status is the alarm mode, a theft has actually happened, and the procedure proceeds to step f35 in order to perform the process for intimidating the burglar and informing the surrounding area with an alarm sound, and the drive recorder CPU 122 determines whether the mode has switched from another mode to the alarm mode for the first time. If it is determined that this is the first time, the procedure proceeds to step f36, in which the drive recorder CPU 122 sets the time period T2 during which an alarm sound is outputted in the alarm mode, and the procedure proceeds to step f37. In step f37, the drive recorder CPU 122 causes the buzzer 50 to start outputting an alarm sound, and the procedure proceeds to step f38.

Steps f38 to f43 are the processes of setting the configuration information for recording image and sound information related to a theft, and respectively correspond to steps b22 to b27 in the flowchart shown in FIG. 10. The only difference is that the operation is performed by the drive recorder CPU 122, and therefore, the description thereof will be omitted. If a negative determination is made in step f35, or when the process of step f40 or f43 ends, the procedure proceeds to step f44.

Steps f44 to f46 are the processes for stopping the alarm sound and setting the alert mode, and respectively correspond to steps a22 to a24 in the flowchart shown in FIG. 8. The only difference is that the operation is performed by the drive recorder CPU 122, and therefore, the description thereof will be omitted. If a negative determination is made in step f34 or f44, or when the process of step f46 ends, the procedure proceeds to step f47.

Steps f47 to f55 are the processes for acquiring image and sound information by the drive recorder cameras 11 and 11A and the drive recorder microphone 12 and storing the acquired information into the second RAM 125 in the preliminary alarm mode and the alarm mode, and respectively correspond to steps b28 to b36 in the flowchart shown in FIG. 10. The only difference is that the operation is performed by the drive recorder CPU 122, and therefore, the description thereof will be omitted. If a negative determination is made in step f47 or f53, or when the process of step f55 ends, the procedure proceeds to step b56.

Steps f56 to f59 are the processes for recording image and sound information into the nonvolatile ROM 121, and respectively correspond to steps b37 to b40 in the flowchart shown in FIG. 11. The only difference is that the operation is performed by the drive recorder CPU 122, and therefore, the description thereof will be omitted. If a negative determination is made in step f56 or f58, or when step f59 ends, the operation is ended, and the procedure proceeds to step f1 again.

As has been described above, the information recording apparatus 100 can achieve the same effect as that of the information recording apparatus 1 of the above-described embodiment. In addition, whereas the drive recorder 2 and the anti-theft device 3 in the information recording apparatus 1 described above are provided separately, the functions of the drive recorder 2 and the anti-theft device 3 described above are realized using a single device in the information recording apparatus 100. Accordingly, it is possible to implement the drive recorder CPU 22 and the anti-theft CPU 52 by a single CPU, to implement the nonvolatile ROM 21 and the anti-theft ROM 51 by a single nonvolatile ROM 121, and to implement the second RAM 25 and the anti-theft RAM 56 by a single second RAM 125, so that the apparatus can be made compact, thereby realizing a further reduction in the production cost. Moreover, since vibrations are detected using the G sensor 30, the information recording apparatus of this embodiment can also be mounted in vehicles that do not include a vibration sensor 64. Furthermore, since it is not necessary to provide the vibration sensor 64 separately from the information recording apparatus 100, the information recording apparatus can be made compact, thereby realizing a further reduction in the production cost.

Figure 22:
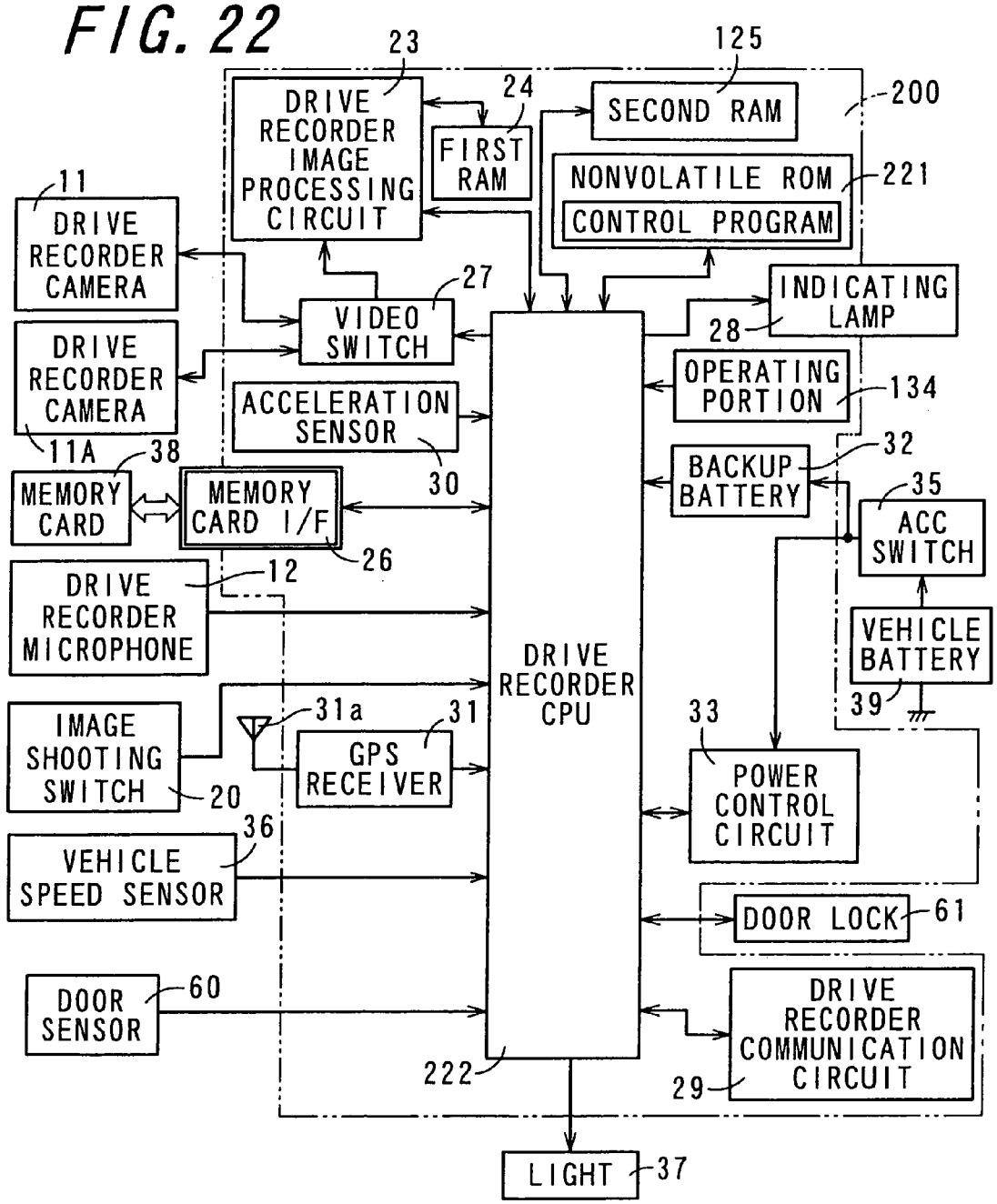
FIG. 22 is a block diagram showing the electrical configuration of an information recording apparatus according to a fifth embodiment of the invention.
Figure 23:
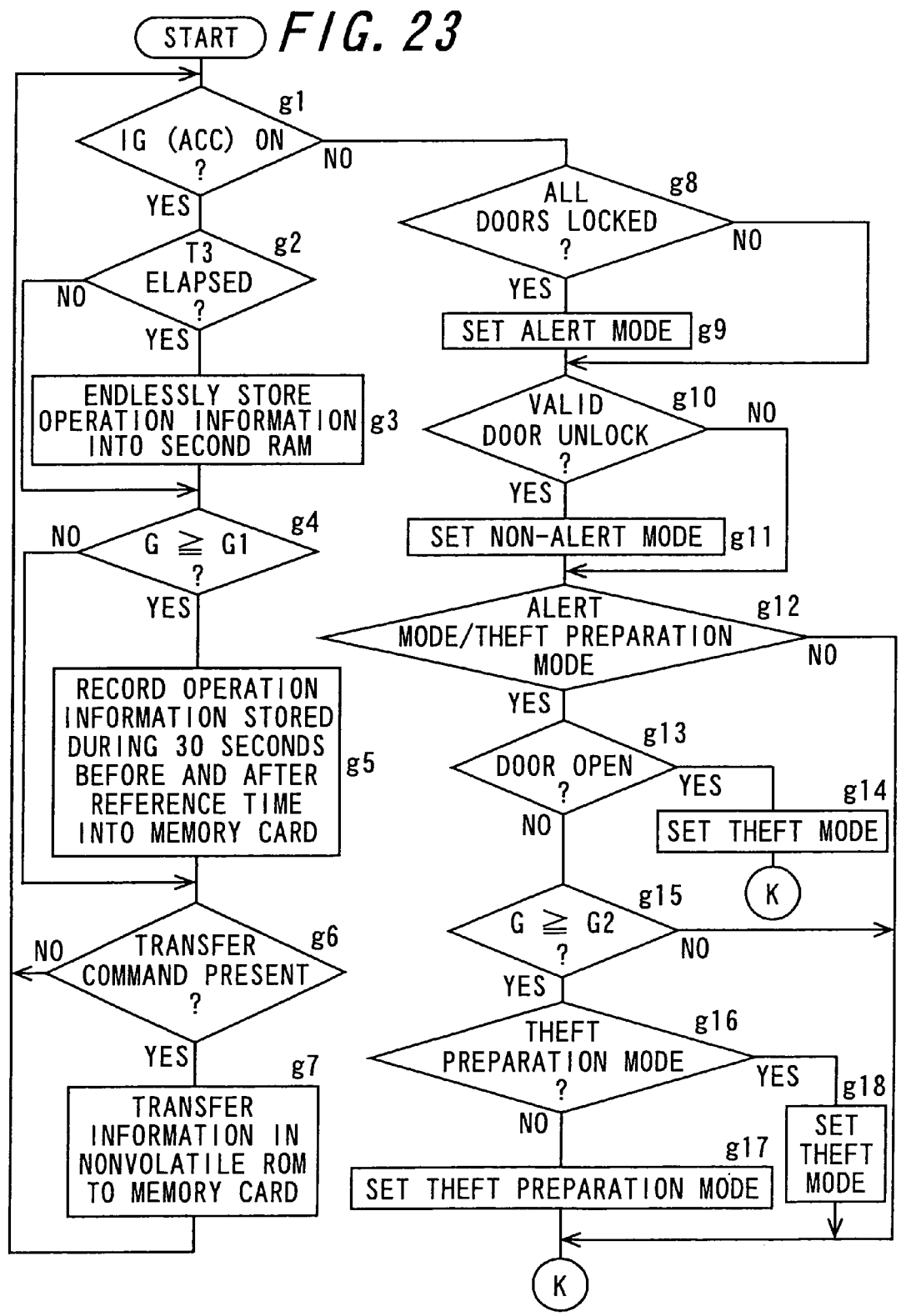
Figure 24:
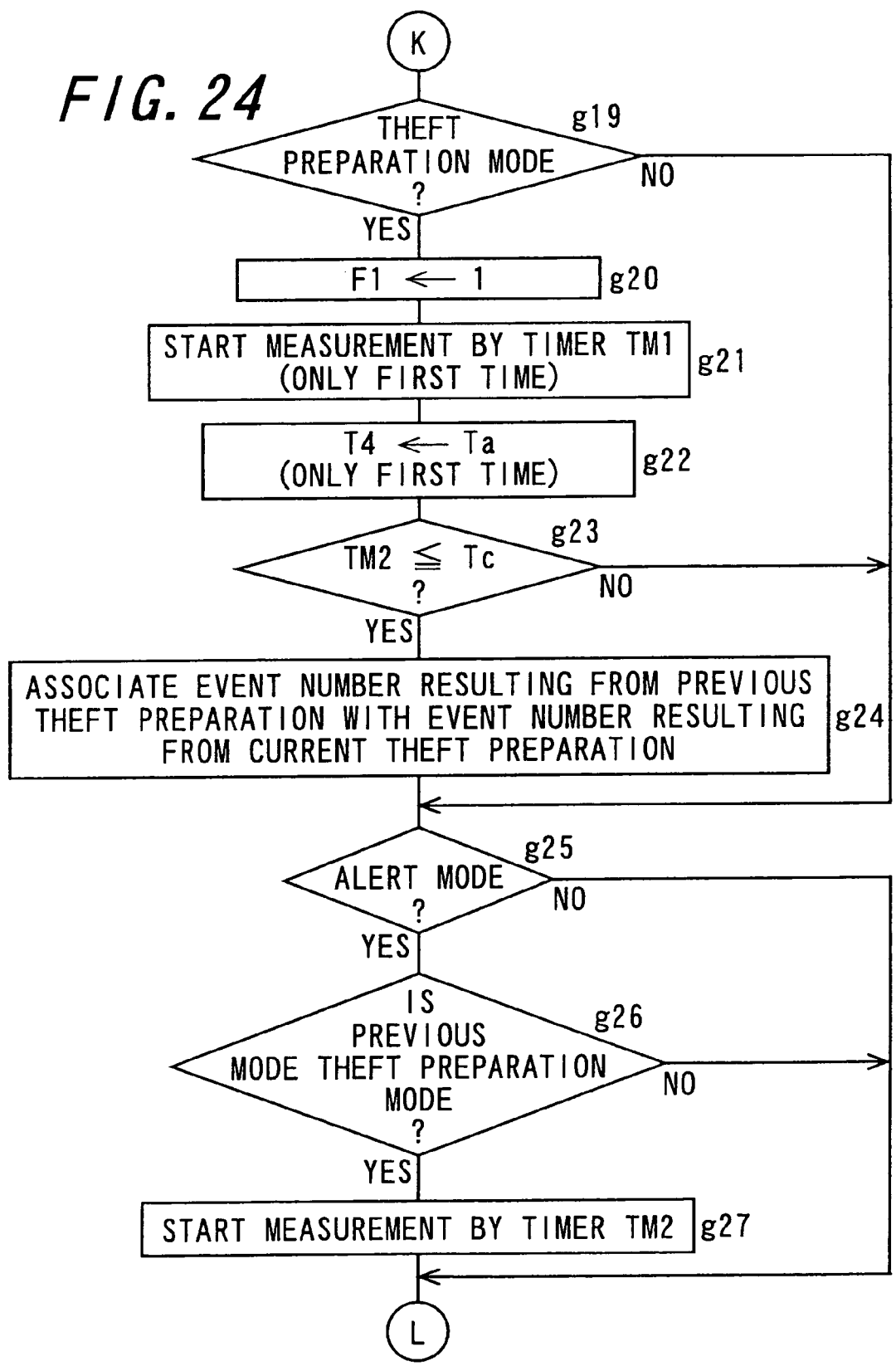
Figure 25:
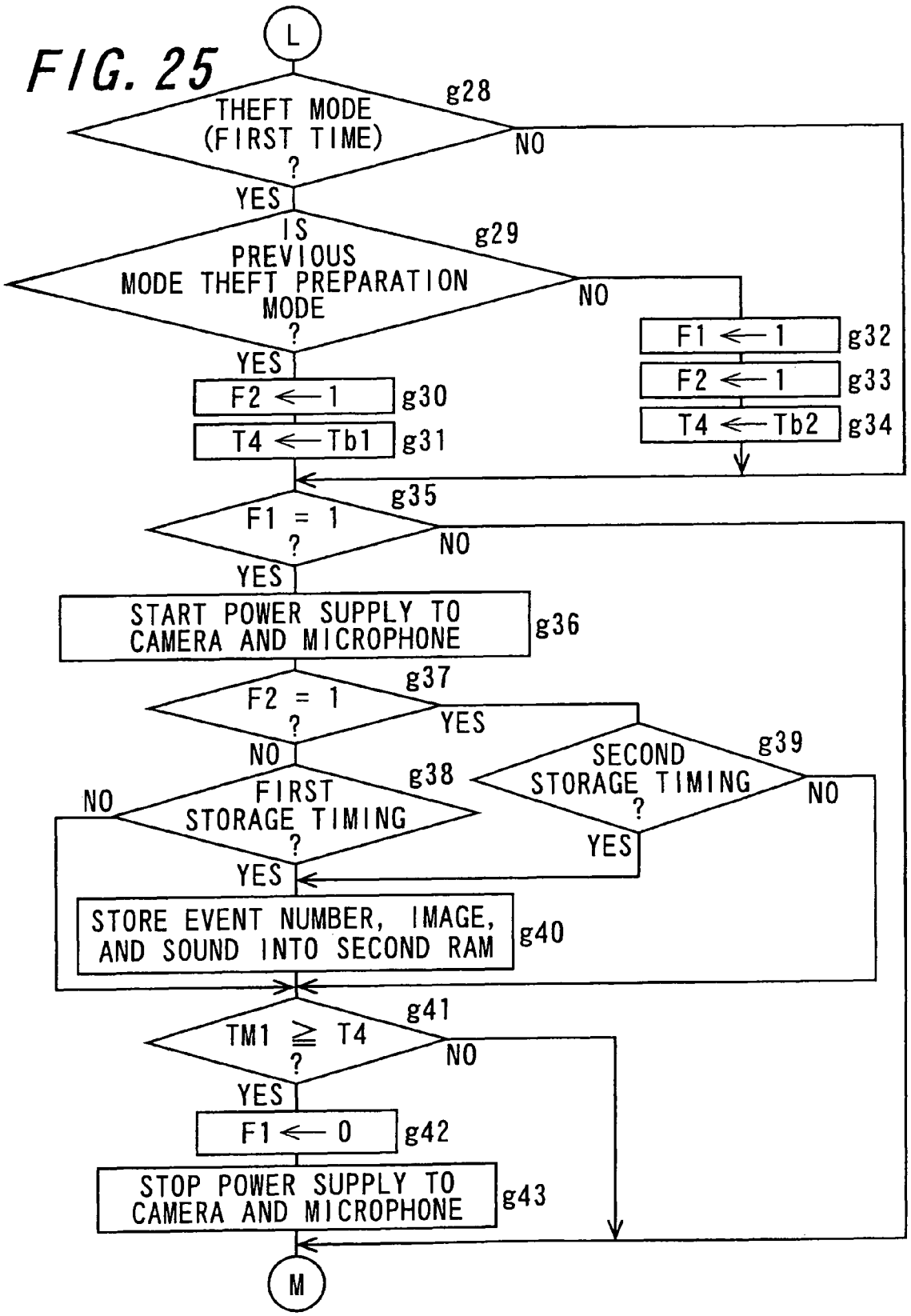

FIG. 22 is a block diagram showing the electrical configuration of an information recording apparatus 200 according to a fifth embodiment of the invention. The information recording apparatus 200 of this embodiment is similar to the information recording apparatus 100 of the above-described embodiment. However, the information recording apparatus 200 is different from the information recording apparatus 100 in that whereas the information recording apparatus 100 is configured such that the drive recorder CPU 122 detects a theft using the glass breakage sensor 58, the intrusion sensor 59, and the vibration sensor 64, the information recording apparatus 200 of this embodiment is configured such that the drive recorder CPU 222 detects a theft using the G sensor 30 included in the information recording apparatus 200 and a door sensor 60 included in a vehicle, and that whereas the information recording apparatus 100 includes the buzzer 50 that outputs an alarm sound, the information recording apparatus 200 of this embodiment does not include a buzzer, i.e., does not have the alarm function. Therefore, the components of the information recording apparatus 200 that are the same as those of the information recording apparatus 100 described above are denoted by the same reference numerals, with the overlapping description omitted, and different parts will be described. In this embodiment, the security status is the alert status, a theft preparation status (theft preparation mode), or a theft status (theft mode). The theft preparation status corresponds to the preliminary alarm status described above, and the theft status corresponds to the alarm status described above.

The information recording apparatus 200 includes a nonvolatile ROM 221, a drive recorder CPU 222, a drive recorder image processing circuit 23, a first RAM 24, a second RAM 125, a memory card I/F 26, a video switch 27, an indicating lamp 28, a drive recorder communication circuit 29, a G sensor 30, a GPS receiver 31, a backup battery 32, a power control circuit 33, and an operating portion 134.

The drive recorder CPU 222 has the same functions as both of the drive recorder CPU 22 and the anti-theft CPU 52 described above. The nonvolatile ROM 221 has the functions of both of the nonvolatile ROM 21 and the anti-theft ROM 51 described above, and records the control program according to this embodiment therein.

The second RAM 125 stores set status information indicating that the security status of the information recording apparatus 200 is set to the alert status, the theft preparation status, or the theft status. By reading out this set status information, the drive recorder CPU 222 can determine which of the alert status, the theft preparation status, or the theft status is set.

FIGS. 23, 24, 25, and 26 are flowcharts illustrating an operation performed when the drive recorder CPU 222 executes the control program stored in the nonvolatile ROM 221. When power is supplied to the drive recorder CPU 222, the procedure proceeds to step g1, and the process is commenced.

In step g1, the drive recorder CPU 222 determines whether the IG switch or the ACC switch is on. If it is determined in step g1 that the IG switch or the ACC switch is on, the procedure proceeds to step g2 for performing the recording process as an ordinary drive recorder during driving conditions. If it is determined that the IG switch or the ACC switch is not on, the procedure proceeds to step g8 for performing the theft monitoring process during non-driving conditions.

Steps g2 to g7 respectively correspond to steps b3 to b8 described above in the flowchart shown in FIG. 9. The only difference is that the operation is performed by the drive recorder CPU 222, and therefore, the detailed description thereof will be omitted. If the drive recorder CPU 222 makes a negative determination in step g6, or when the process of step g7 ends, the procedure proceeds to step g1.

In step g8, the drive recorder CPU 222 determines whether all the doors are locked based on a detection signal from the door lock portion 61. If it is determined in step g8 that all the doors are locked, then it is determined that the theft monitoring process should be performed, and the procedure proceeds to step g9, in which the drive recorder CPU 222 sets the alert mode, i.e., causes the second RAM 125 to store thereinto information indicating that the security status is the alert status, and the procedure proceeds to step g10. If a negative determination is made in step g8, the procedure proceeds to step g10.

In step g10, the drive recorder CPU 222 determines whether the doors are brought into the unlocked state in a valid manner. Here, the door lock portion 61 outputs different signals as signal indicating the unlocked state in a case where the doors are brought into the unlocked state in a valid manner, and a case where the doors are brought into the unlocked in an invalid manner. The case where the doors are brought into the unlocked state in a valid manner is a case where the doors are brought into the unlocked state using the valid door key, or where the door locks are brought into the unlocked state using a transmitter (not shown). The case where the doors are brought into the unlocked state in an invalid manner is a case where the door locks are brought into the unlocked state from the vehicle exterior without using the valid door key. If it is determined in step g10 that the doors are brought into the unlocked state in a valid manner, then it is determined that there is no need for alert, and the procedure proceeds to step g11, in which the drive recorder CPU 222 sets the non-alert mode, and the procedure proceeds to step g12. If a negative determination is made in step g10, the procedure proceeds to step g12.

In step g12, the drive recorder CPU 222 determines whether the security status is the alert mode or the theft preparation mode, i.e., determines whether the security status stored in the second RAM 125 is the alert status or the theft preparation status. If it is determined in step g12 that the security status is the alert mode or the theft preparation mode, then it is determined that the mode has shifted to the mode in which theft monitoring is performed, and the procedure proceeds to step g13, in which the drive recorder CPU 222 determines whether the any of the vehicle doors has been opened based on a detection signal from the door sensor 60. If it is determined in step g13 that the vehicle door has been opened, then it is determined that an illegal intrusion into the vehicle has occurred, and the procedure proceeds to step g14, in which the drive recorder CPU 222 sets the theft mode in which the process for causing the drive recorder 2 to record the image and sound information relating to the illegal intruder, i.e., causes the second RAM 125 to store thereinto information indicating that the security status is the theft status, and the procedure proceeds to step g19. If a negative determination is made in step g13, the procedure proceeds to step g15.

In step g15, the drive recorder CPU 222 determines whether an acceleration G detected by the G sensor 30 is equal to or more than the predetermined value G2 based on a signal detected by the G sensor 30. If it is determined in step g15 that the acceleration G is equal to or more than the predetermined value G2, then it is determined that an abnormal condition has occurred, and that abnormal condition may lead to a theft or is caused by a theft, and the procedure proceeds to step g16, in which the drive recorder CPU 222 determines whether the security status is the theft preparation mode. If it is determined in step g16 that the security status is not the theft preparation mode, then it is determined that the abnormal condition has not lead to a theft, but may lead to a theft, and the procedure proceeds to step g17, in which the drive recorder CPU 222 sets the theft preparation mode, i.e., causes the second RAM 125 to store thereinto information indicating that the security status is the theft preparation status, and the procedure proceeds to step g19.

If it is determined in step g16 that the security status is the theft preparation mode, this indicates that the second abnormal condition has been detected in the theft preparation status, so that it is determined that the abnormal condition is an actual theft, and the procedure proceeds to step g18. In step g18, the drive recorder CPU 222 sets the theft mode, i.e., causes the second RAM 125 to store thereinto information indicating that the security status is the theft status, and the procedure proceeds to step g19. If a negative determination is made in step g12 or g15, the procedure proceeds to step g19.

In step g19, the drive recorder CPU 222 determines whether the current security status is the theft preparation mode. If it is determined in step g19 that the security status is the theft preparation mode, this indicates that an abnormal condition has occurred, and the procedure proceeds to step g20 in order to store image and sound information into the second RAM 125, and the drive recorder CPU 222 sets the storage permission flag F1 stored in the first flag storage area of the internal memory to "1", and the procedure proceeds to step g21.

In step g21, the drive recorder CPU 222 effects start of time measurement by the timer TM1 for measuring the storage time period of the image and sound information into the second RAM 125, and the procedure proceeds to step g22. In step g22, the drive recorder CPU 222 sets the storage time period T4 of the image and sound information into the second RAM 125 to the first time period Ta, and the procedure proceeds to step g23. In a case where the process in which the procedure proceeds to step b13 is successively performed in the determination process in step g19, the processes of steps g21 and g22 are performed only the first time that the procedure proceeds to step g21 or g22.

In step g23, the drive recorder CPU 222 determines whether the measured value TM2 of the timer TM2 that measures the time elapsed from the end of the previous theft preparation mode is equal to or shorter than the third time period Tc. If it is determined in step g23 that the measured value TM2 is equal to or shorter than the third time period Tc, the procedure proceeds to step g24. In step g24, since there is the possibility that the previous and current theft preparation modes are caused by a single theft, the drive recorder CPU 222 associates the event numbers resulting from the previous and current theft preparation modes with each other, and the procedure proceeds to step g25. If a negative determination is made in step g19 or g23, the procedure proceeds to step g25.

In step g25, the drive recorder CPU 222 determines whether the information representing the current security status is the alert mode, or in other words, represents the alert status. If it is determined in step g25 that the security status is the alert mode, the procedure proceeds to step g26, in which the drive recorder CPU 222 determines whether the information representing the previous security status stored in the security status storage area of the second RAM 125 is the theft preparation mode. If it is determined in g26 that the security status is the theft preparation mode, this indicates that the mode has shifted to the alert mode without shifting to the theft mode during the period of the theft preparation mode. Accordingly, the procedure proceeds to step b27, in which the drive recorder CPU 222 effects start of the time measurement by the timer TM2 for measuring the time elapsed from the end of the theft preparation mode, and the procedure then proceeds to step b28. If a negative determination is made in step g25 or g26, the procedure proceeds to step g28.

In step g28, the drive recorder CPU 222 determines whether the information representing the current security status is the theft mode, and whether the mode has shifted from another mode to the theft mode for the first time. If it is determined in step g28 that the security status is the theft mode, then it is determined that the abnormal condition is an actual theft, and the procedure proceeds to step g29 in order to set the configuration information for recording image and sound information related to the theft. In step g29, the drive recorder CPU 222 determines whether the information representing the previous security status is the theft preparation mode. If it is determined in step g29 that the security status is the theft preparation mode, this indicates that the mode has shifted to the theft mode from the alert mode after shifting to the theft preparation mode. Accordingly, the procedure proceeds to step g30. If it is determined in step g29 that the information is not the theft preparation mode, this indicates that the mode has shifted from the alert mode to the theft mode without shifting to the theft preparation mode, and the procedure proceeds to step g32.

Steps g30 to g34 respectively correspond to steps b23 to b27 in the flowchart shown in FIG. 10. The only difference is that the operation is performed by the drive recorder CPU 222, and therefore, the detailed description thereof will be omitted.

If a negative determination is made in step g28, or when step g31 or g34 ends, the procedure proceeds to step g35. Steps g35 to g43 are the processes for acquiring image and sound information with the drive recorder cameras 11 and 11A and the drive recorder microphone 12 and storing the acquired information into second RAM 125 in the theft preparation mode and the theft mode, and respectively correspond to steps b28 to b36 in the flowchart shown in FIG. 10. The only difference is that the operation is performed by the drive recorder CPU 222, and therefore, the description thereof will be omitted. If a negative determination is made in step g35 or g41, or the process of step g43 ends, the procedure proceeds to step g44.

Steps g44 to g47 are the processes for recording image and sound information into the nonvolatile ROM 221, and respectively correspond to steps b37 to b40 in the flowchart shown in FIG. 11. The only difference is that the operation is performed by the drive recorder CPU 222, and therefore, the description thereof will be omitted. When step g47 ends, the operation is ended, and the procedure proceeds to step g1 again.

As has been described above, the information recording apparatus 200 can achieve the same effect as that of the information recording apparatus 1 of the above-described embodiment by only using detection signals from the door sensor 60 and the door lock portion 61, except for the generation of an alarm sound. Since the information recording apparatus 200 does not require the function for detecting signals from various sensors as in the case of the information recording apparatus 1 of the above-described embodiment, the apparatus can be made compact, thereby achieving a further reduction in the production cost.

In the above-described embodiments, when image and sound information are recorded into the nonvolatile ROMs 21, 121, and 221, the image and sound information are also supplied to the data communication apparatus 4, and the image and sound information are transmitted by the data communication apparatus to the external communication apparatus. However, the image and sound information may not be supplied to the data communication apparatus 4. By supplying the image and sound information also to the data communication apparatus 4 at the time of recording the image and sound information into the nonvolatile ROMs 21, 121, and 221, and transmitting the image and sound information to the external communication apparatus by the data communication apparatus as in the above-described embodiments, it is possible to identify the criminal and to know the method employed in the criminal act, from the image and sound information acquired from the external communication apparatus even in a case where a problem such as destruction of the information recording apparatus occurs.

Although both the drive recorder cameras 11 and 11A and the drive recorder microphone 12 are provided in the above-described embodiments, it is possible to adopt a configuration in which only one of the two devices is provided. In the case of adopting a configuration in which either the drive recorder cameras 11 and 11A or the drive recorder microphone 12 is provided, it is more preferable to provide the drive recorder cameras 11 and 11A.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and a range of equivalency of the claims are therefore intended to be embraced therein.

What is claimed is:

1. An information recording apparatus comprising:
    a storage portion configured as a ring buffer so as to endlessly store thereinto at least one of image information and sound information of the interior or exterior of a vehicle, the information being acquired by an acquisition portion,
    an abnormal condition detection portion configured to detect the presence of an abnormal condition of the vehicle based on a signal from a sensor configured to detect an abnormal condition,
    a recording portion composed of nonvolatile memory configured to record thereinto the information stored in the storage portion,
    a control portion configured to cause the storage portion to store thereinto the information acquired by the acquisition portion for a first time period from a detection of occurrence of the abnormal condition of the vehicle by the abnormal condition detection portion, and
    when the abnormal condition detection portion has detected the abnormal condition of the vehicle again during the first time period from the detection of occurrence of the abnormal condition of the vehicle, the control portion, having thus concluded that the abnormal condition is an actual theft, is configured to cause the storage portion to store thereinto the information acquired by the acquisition portion for a second time period that is longer than the first time period from a previous detection of occurrence of the abnormal condition of the vehicle, and is configured to cause the recording portion to record thereinto the information stored in the storage portion for the second time period, and
    when the abnormal condition is newly detected by the abnormal condition detection portion after the first time period has elapsed but before a third time period longer than the first time period elapses, the control portion is configured to cause the recording portion to record thereinto the information stored in the storage portion at a time of the previous detection of occurrence of the abnormal condition together with the information stored in the storage portion at a time of the newly detected occurrence of the abnormal condition.

2. The information recording apparatus of claim 1,
    wherein the sensor includes an impact sensor configured to detect an impact applied to the vehicle, and,
    when the vehicle is in operation, the control portion is configured to cause the storage portion to store thereinto at least one of the image information and the sound information acquired by the acquisition portion, and is configured to cause the recording portion to record thereinto the information stored in the storage portion based on a signal from the impact sensor, and, when the vehicle is parked, the control portion is configured to control the storage portion and the recording portion in accordance with a result of the detection.

3. The information recording apparatus of claim 1,
    wherein a drive recorder configured to record at least one of the image information and the sound information when the vehicle is in operation is provided, and a security device is provided,
    the sensor includes an impact sensor configured to detect an impact applied to the vehicle,
    the control portion includes a recorder side control portion included in the drive recorder, and a security side control portion included in the security device,
    the storage portion and the recording portion are each included in the drive recorder,
    the abnormal condition detection portion is included in the security device,
    the security side control portion is configured to supply a result of the detection performed by the abnormal condition detection portion to the recorder side control portion, and,
    when the vehicle is in operation, the recorder side control portion is configured to cause the storage portion to store thereinto at least one of the image information and the sound information, and is configured to cause the recording portion to record thereinto the information stored in the storage portion based on a signal from the impact sensor, and, when the vehicle is parked, the recorder side control portion is configured to control the storage portion and the recording portion in accordance with a result of the detection.

4. The information recording apparatus of claim 1,
    wherein the acquisition portion includes an image pickup device or a sound acquisition device, the image pickup device is configured to acquire the image information, and the sound acquisition device is configured to acquire the sound information.

5. The information recording apparatus of claim 1, wherein the sensor includes a state detection sensor configured to detect a state change in a predetermined area surrounding the vehicle and the interior of the vehicle using radio waves.

6. The information recording apparatus of claim 1, wherein the storage portion is configured to endlessly store thereinto image information of the interior or exterior of a vehicle.

* * * * *